US010452349B2

United States Patent
Kim et al.

(10) Patent No.: US 10,452,349 B2
(45) Date of Patent: Oct. 22, 2019

(54) ELECTRONIC DEVICE AND OPERATION CONTROL METHOD THEREFOR

(71) Applicant: Samsung Electronics Co., Ltd., Gyeonggi-do (KR)

(72) Inventors: Sangwook Kim, Seoul (KR); Hyunseok Shin, Gyeonggi-do (KR); Seungnyun Kim, Incheon (KR); Yongsang Yun, Gyeonggi-do (KR); Changryong Heo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 162 days.

(21) Appl. No.: 15/263,539

(22) Filed: Sep. 13, 2016

(65) Prior Publication Data

US 2017/0083494 A1    Mar. 23, 2017

(30) Foreign Application Priority Data

Sep. 17, 2015    (KR) .................. 10-2015-0131637

(51) Int. Cl.
*G06F 3/16* (2006.01)
*H04R 1/10* (2006.01)
(Continued)

(52) U.S. Cl.
CPC ........... *G06F 3/167* (2013.01); *H04R 1/1041* (2013.01); *H04R 3/005* (2013.01); *H04R 3/12* (2013.01);
(Continued)

(58) Field of Classification Search
USPC ......... 381/78, 79, 89, 91, 92, 339, 340, 312, 381/313; 704/3, 4, 5, 231, 235
See application file for complete search history.

(56) References Cited

U.S. PATENT DOCUMENTS

2007/0127753 A1*  6/2007  Feng .................. H04R 1/406
                                                       381/313
2012/0010869 A1   1/2012  McCarley et al.
(Continued)

*Primary Examiner* — Yosef K Laekemariam
(74) *Attorney, Agent, or Firm* — Cha & Reiter, LLC

(57) ABSTRACT

The present disclosure provides an electronic device and methods for operating the electronic device. The electronic device may include: a housing having a coupling member removably attachable to an ear of a user; one or more microphones provided within the housing and configured to detect an external sound; at least one speaker provided within the housing; at least one communication circuit within the housing; a processor provided within the housing and electrically coupled to the one or more microphones, the at least one speaker, and the at least one communication circuit; and at least one memory provided within the housing, and electrically coupled to the processor. The memory may store instructions that cause, when executed, the processor to receive the detected external sound from the one or more microphones, to identify an direction of the external sound in relation to the user, to determine whether the direction of the external sound is within a predefined range, and to extract at least a portion of the external sound for further processing when the direction of the external sound is within the predefined range.

28 Claims, 18 Drawing Sheets

(51) Int. Cl.
*H04R 5/027* (2006.01)
*H04R 3/00* (2006.01)
*H04R 3/12* (2006.01)

(52) U.S. Cl.
CPC ........ *H04R 5/027* (2013.01); *H04R 2201/109* (2013.01); *H04R 2225/55* (2013.01); *H04R 2420/01* (2013.01); *H04R 2430/01* (2013.01); *H04R 2430/20* (2013.01); *H04R 2430/21* (2013.01)

(56) References Cited

U.S. PATENT DOCUMENTS

| | | | |
|---|---|---|---|
| 2012/0215532 A1* | 8/2012 | Foo | H04R 25/505 704/235 |
| 2015/0081291 A1* | 3/2015 | Jeon | G06F 3/167 704/235 |

* cited by examiner

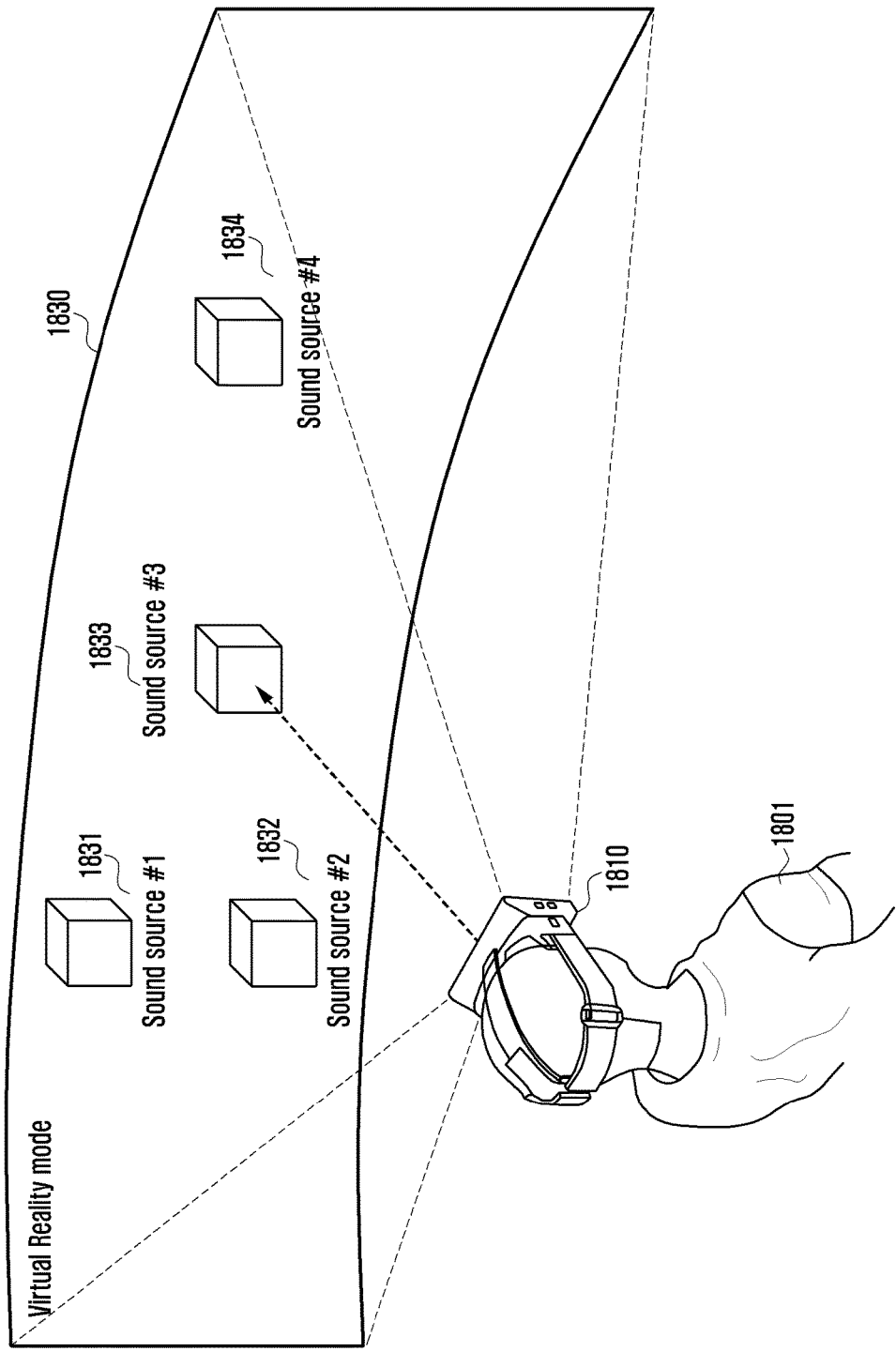

ELECTRONIC DEVICE AND OPERATION CONTROL METHOD THEREFOR

CLAIM OF PRIORITY

This application claims the benefit under 35 U.S.C. § 119(a) of Korean patent application filed on Sep. 17, 2015 in the Korean Intellectual Property Office and assigned Serial number 10-2015-0131637, the entire disclosure of which is hereby incorporated by reference.

TECHNICAL FIELD

One or more embodiments of the present disclosure relate to an electronic device and operation control method therefor wherein detected audio or sounds are processed according to the direction of the detected sound.

BACKGROUND

Various types of electronic devices are utilized in everyday life. Some electronic devices, such as smart phones, have a variety of functions such as call handling, content playback, and content recording. Other electronic devices may have limited functionality by design. For example, an electronic device such as an audio device may receive an external sound, i.e. record audio, and provide the recorded audio to the user. In the case of an electronic device having a microphone, it may receive an external sound by use of the microphone, and store information of the received sound, i.e. store the recorded audio.

SUMMARY

Accordingly, an aspect of the present disclosure is to provide an electronic device and operation control method therefor wherein a sound can be processed and stored as data or can be processed and transferred to an external electronic device according to the direction of sound reception.

In accordance with an aspect of the present disclosure, there is provided an electronic device. The electronic device may include: one or more microphones configured to detect an external sound, a processor electrically coupled to the one or more microphones, and a memory electrically coupled to the processor. The memory may store instructions that cause, when executed, the processor to receive the detected external sound from the one or more microphones, to identify an direction of the external sound in relation to a user, to determine the direction of the external sound, and to transmit the external sound and determined direction information to an external device.

In accordance with another aspect of the present disclosure, there is provided a method for operating an electronic device. The method may include: detecting a sound using one or more microphones; determining whether a direction of the sound is within a predefined range; and extracting at least a portion of the sound for further processing when the direction of the sound is within the predefined range.

In a feature of the present disclosure, the operation method enables the electronic device to receive and process a sound and to store the processed sound as data or to transfer the same to an external electronic device according to the direction of sound reception.

The method also enables the electronic device to receive a sound and to convert the received sound to text data according to the direction of the sound.

The method may control the electronic device so that text data obtained by conversion of the received sound can be edited and stored or transferred to an external electronic device.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 18 illustrates operations of the electronic device according to one embodiment of the present disclosure.

DETAILED DESCRIPTION

Figure 1:
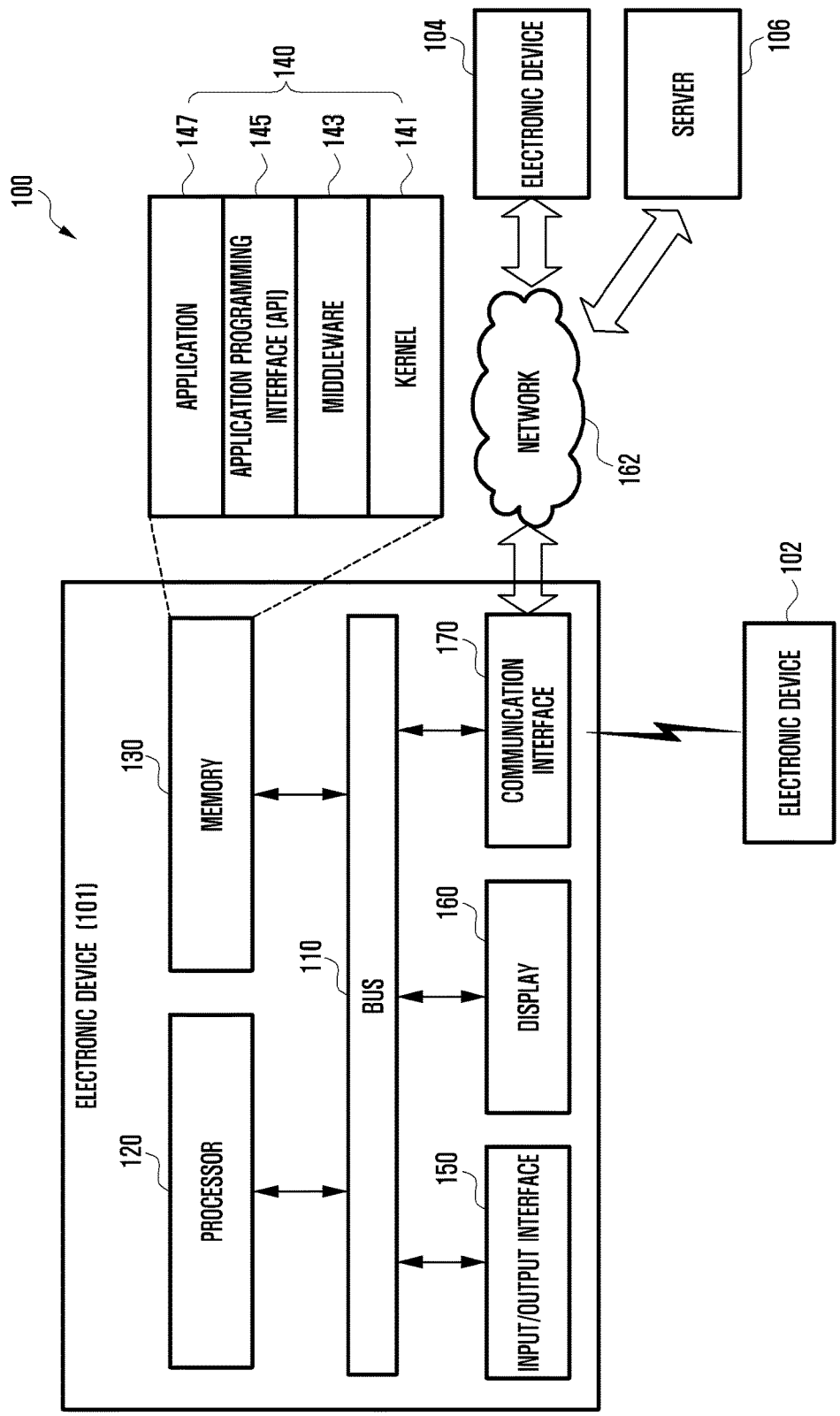
FIG. 1 illustrates a network environment including electronic devices according to one embodiment of the present disclosure.

Hereinafter, exemplary embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the invention and is not intended to limit the invention to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate exemplary embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

FIG. 1 is a block diagram 100 illustrating an electronic apparatus according to an embodiment of the present disclosure.

Referring to FIG. 1, the electronic apparatus 101 may include a bus 110, a processor 120, a memory 130, a user input module 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include softwares and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and another electronic devices 102 and 104 and/or a server 106. The communication interface 170 can support short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
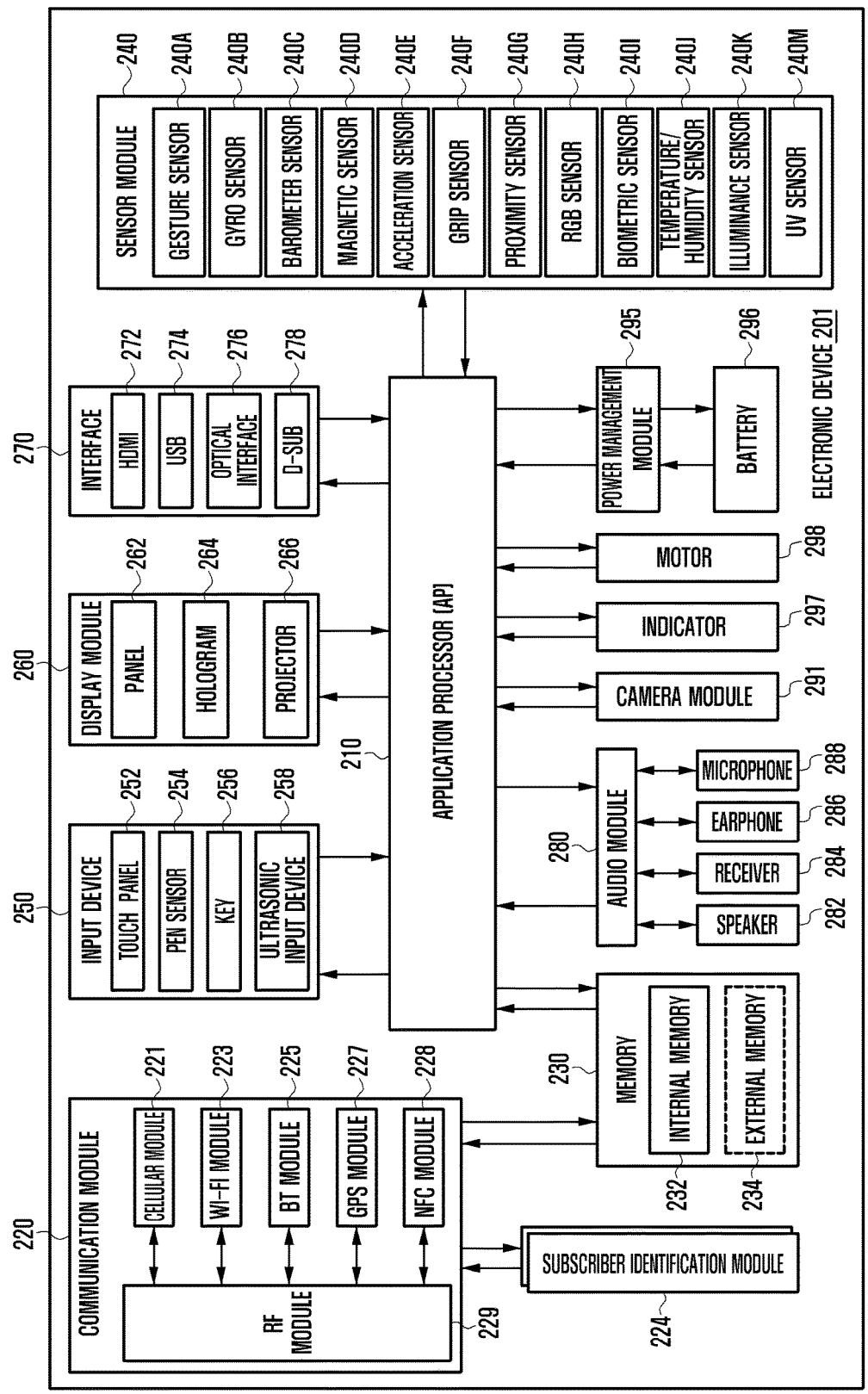
FIG. 2 is a block diagram of an electronic device according to one embodiment of the present disclosure.

FIG. 2 is a block diagram illustrating an electronic device 201 in accordance with an embodiment of the present disclosure. The electronic device 201 may form, for example, the whole or part of the electronic device 201 shown in FIG. 1. Referring to FIG. 2, the electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 3, the AP 210 may be formed to have at least part (e.g., the cellular module 321) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

Figure 3:
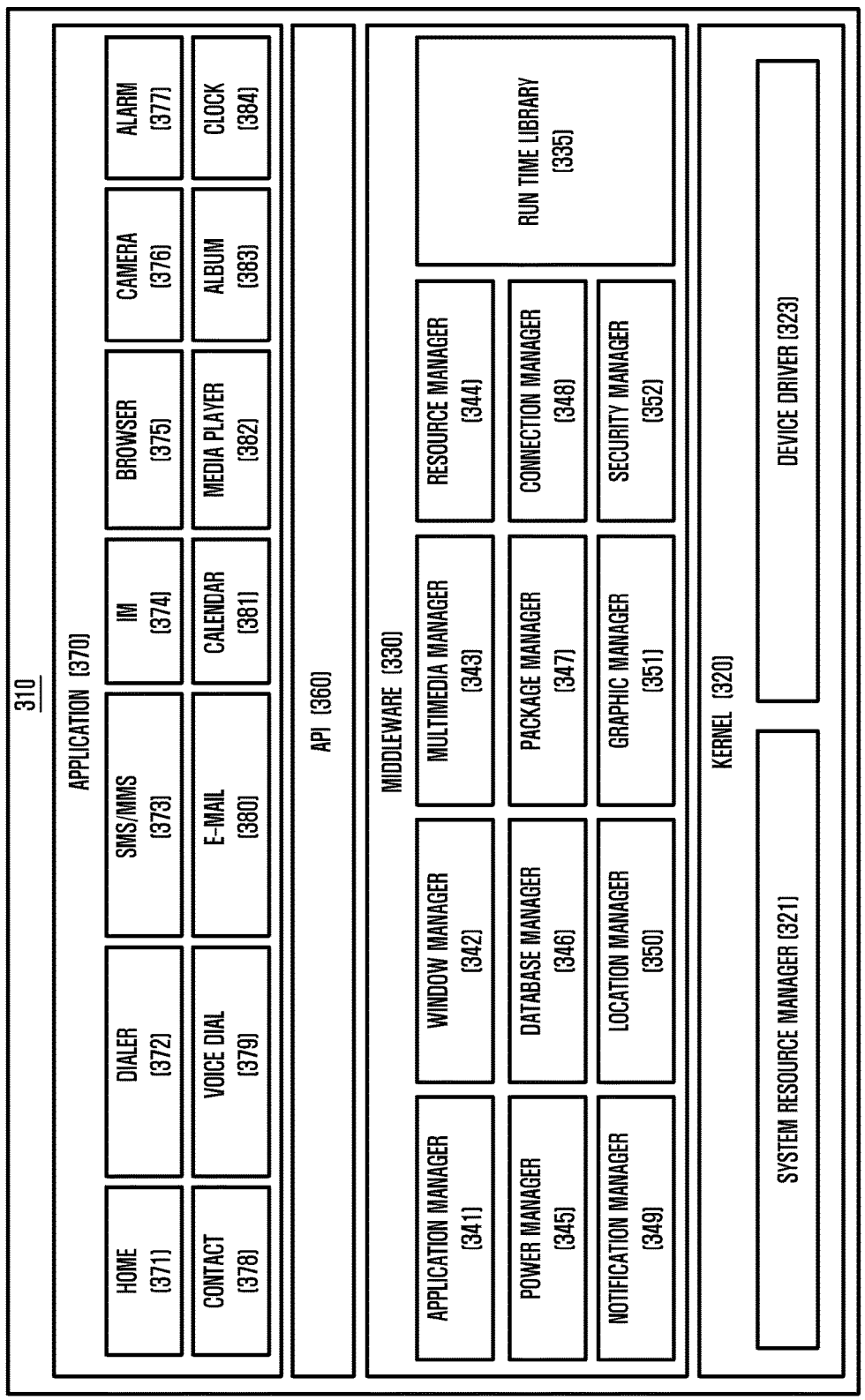
FIG. 3 is a block diagram of a program module according to one embodiment of the present disclosure.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 3 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 334 may be functionally connected to the electronic device 201 through various interfaces. According to an embodiment, the electronic device 301 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 250) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 301 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

FIG. 3 is a block diagram illustrating a configuration of a programming module 310 according to an embodiment of the present disclosure.

The programming module 310 may be included (or stored) in the electronic device 301 (e.g., the memory 330) illustrated in FIG. 1 or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 211) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 435 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 460 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 220. At least a part of the programming module 310 may be implemented (e.g., executed) by, for example, the one or more processors. At least a part of the programming module 310 may include, for example, a module, a program, a routine, a set of instructions, and/or a process for performing one or more functions.

Figure 4:
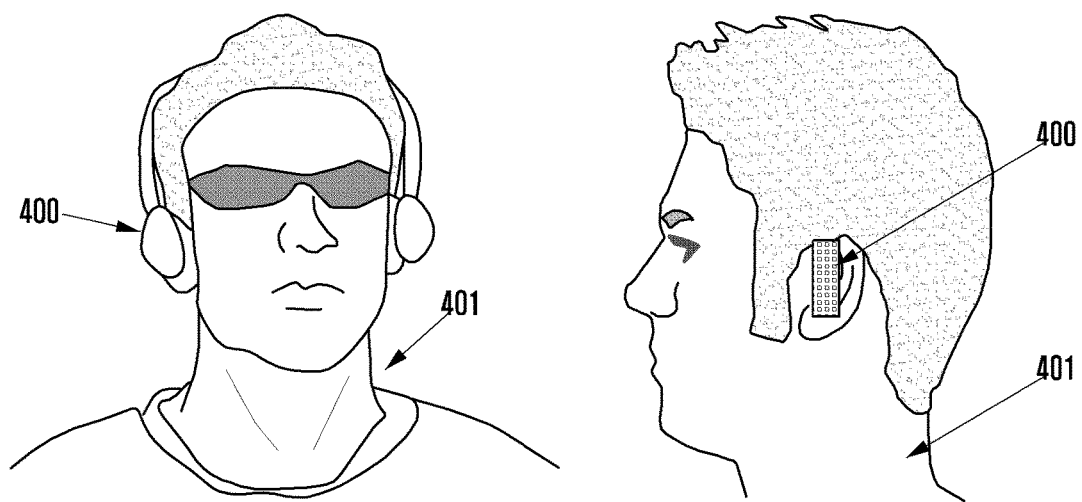
FIG. 4 illustrates usage of the electronic device according to one embodiment of the present disclosure.

FIG. 4 illustrates usage of an electronic device 400 according to one embodiment of the present disclosure.

The electronic device 400 (e.g. auditory device) may provide sound information to the user 401. For example, when the user 401 listens to music or talks over the phone, the electronic device 400 may pick up sound from the user's surroundings and provide amplified sound to the user 401. The electronic device 400 may be worn close to the ear of the user and may use a receiver (e.g. speaker) to properly direct sound to the ear of the user 401. The electronic device 400 may have various types and functions by design. For example, the electronic device 400 may be a headset, headphone, earpiece, hearing aid, or personal sound amplification product. Hearing aid types may include behind-the-ear (BTE), receiver-in-canal (RIC), in-the-ear (ITE), in-the-canal (ITC), and completely-in-canal (CIC).

Figure 5:
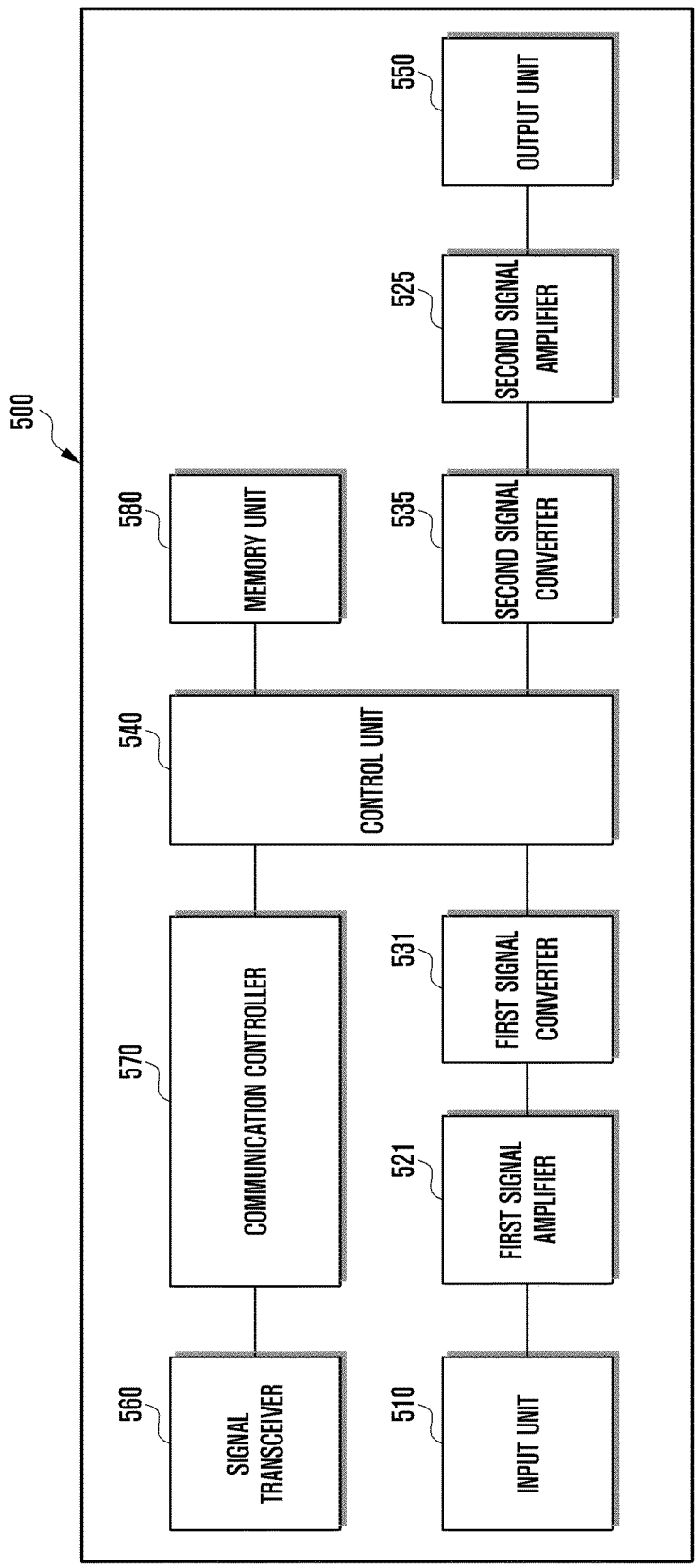
FIG. 5 is a block diagram of the electronic device according to one embodiment of the present disclosure.

FIG. 5 is a block diagram of an electronic device 500 according to one embodiment of the present disclosure.

In one embodiment, the electronic device 500 may have components identical or similar to those shown in FIGS. 1 and 2. For example, the electronic device 500 may have some or all of the components shown in FIGS. 1 and 2.

The electronic device 500 may include an input unit 510 (e.g. microphone), signal amplifiers 521 and 525, signal converters 531 and 535, a control unit 540 (i.e. processor), an output unit 550 (e.g. receiver or speaker), a signal transceiver 560, a communication controller 570, and a memory unit 580.

The electronic device 500 may obtain sound information through the input unit 510. For example, the input unit 510 may pick up sound in proximity of the electronic device 500 to generate an input signal. In one embodiment, the input unit 510 may include one or more microphones.

The electronic device 500 may further include signal amplifiers 521 and 525 (e.g. abbreviated as "AMP"). The signal amplifier 521 or 525 may amplify an analog signal. The signal amplifiers 521 and 525 may include a first signal amplifier 521 (e.g. pre-AMP) to amplify a signal from the input unit 510 and a second signal amplifier 525 (e.g. power AMP) to amplify a signal processed by the control unit 540 for output.

The electronic device 500 may be wirelessly connected or connected via a wire to an external electronic device (e.g. mobile device, mobile terminal, or tablet computer) or to a network. For example, in the case of wireless connection, the electronic device 500 may transmit or receive an input signal through the signal transceiver 560. In one embodiment, the signal transceiver 560 may include one or more antennas.

The communication controller 570 may process (e.g. audio filtering or amplification) a signal inputted through the signal transceiver 560 and forward the processed signal to the control unit 540.

The control unit 540 may process the input signal (e.g. audio filtering or amplification) and output the processed audio signal to the output unit 550. For example, the control unit 540 may process a signal input from the input unit 510 or communication controller 570 and output an audio signal through the output unit 550.

In one embodiment, the control unit 540 may apply different signal processing operations (audio filtering or amplification) according to whether the signal is input from the communication controller 570 or from the input unit 510. The control unit 540 may establish a signal path (e.g. audio signal path or sound signal path) according to presence or absence of a signal from the communication controller 570 or the input unit 510. For example, when a signal is input from the input unit 510, the control unit 540 may establish a signal path from the input unit 510 to the output unit 550 for sound output. When a signal is input from the communication controller 570, the control unit 540 may establish a signal path from the communication controller 570 to the output unit 550 for sound output. In other words, the control unit 540 may switch between the signal path via the input unit 510 and the signal path via the communication controller 570 according to how the input signal was received.

In one embodiment, the control unit 540 may measure the level of power at regular intervals to check the presence of an input signal from the input unit 510. When an input signal is present, the control unit 540 may analyze the input signal to determine the operational mode. For example, the control unit 540 may check whether the input signal is a signal caused by the user or a signal caused by background noise. The control unit 540 may change the mode of the electronic device 500 according to the type of the input signal. For example, upon determining that the input signal is noise from the background, the electronic device 500 may remove the noise signal. As another example, when an input signal with higher than a threshold level is not detected for a given time, the control unit 540 may place at least a part of the electronic device 500 into low power or sleep mode.

The electronic device 500 may include signal converters 531 and 535. The signal converters 531 and 535 may include a first signal converter 531 to convert an analog signal from the input unit 510 into a digital signal (e.g. analog-to-digital conversion (ADC)), and a second signal converter 535 to convert a digital signal into an analog signal for output (e.g. digital-to-analog conversion (DAC)).

The memory unit 580 may store information needed for determining the type of an input signal (e.g. voice of the user). The memory unit 580 may store mode information, function information, and auditory parameters of the electronic device 500. For example, the auditory parameters may include information regarding noise attenuation values, filter coefficients, pass and cutoff frequencies, sound amplification values, directionality, user fitting values.

The memory unit 580 may store one or more instructions that direct, when executed by the control unit 540, the control unit 540 to perform the function corresponding to the executed instruction.

Figure 6:
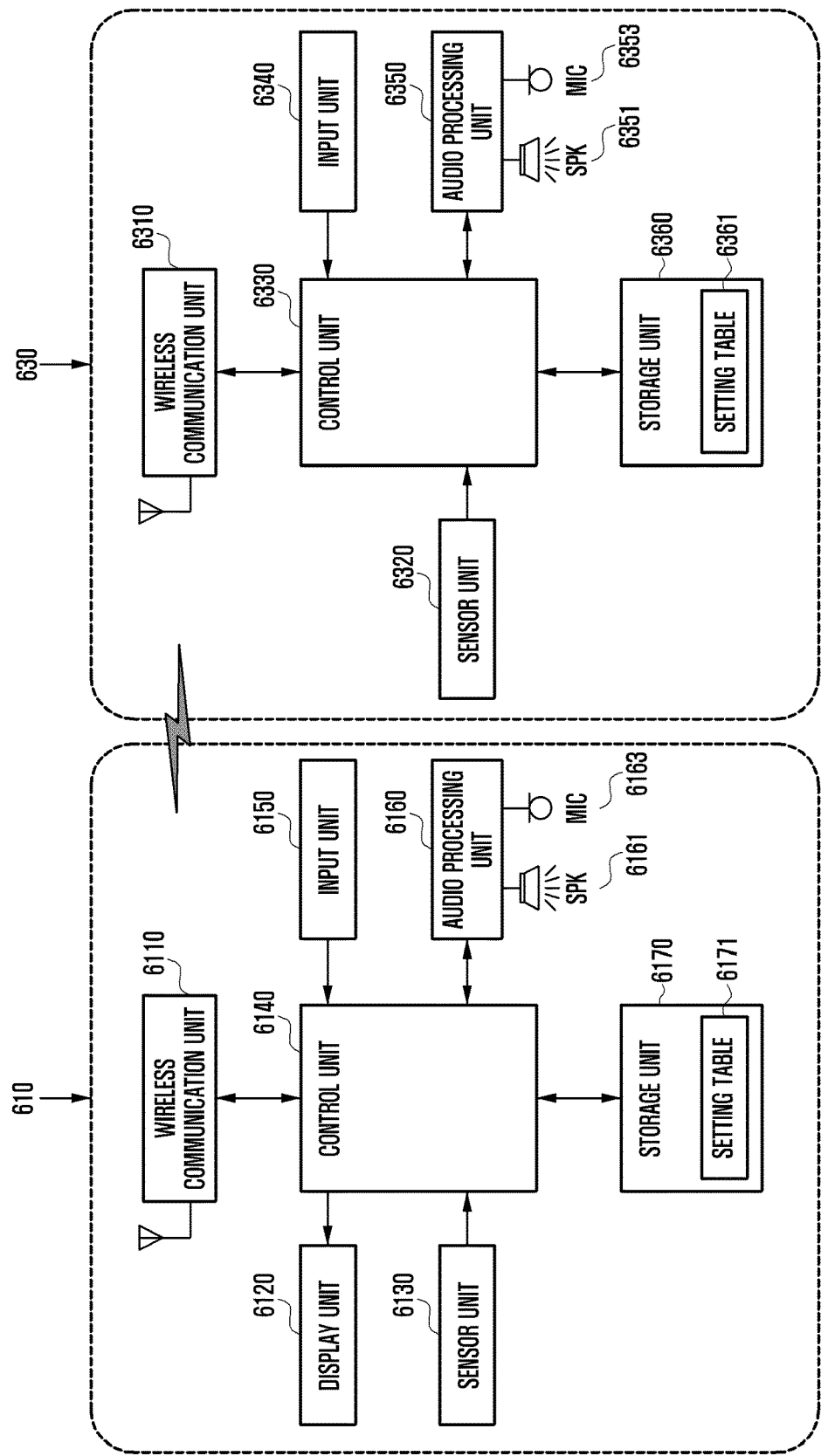
FIG. 6 illustrates an electronic device and external electronic device according to one embodiment of the present disclosure.

FIG. 6 illustrates an electronic device 630 and external electronic device 610 according to one embodiment of the present disclosure.

In one embodiment, the electronic device 630 and the external electronic device 610 may include some or all of the components of the electronic device 101 or 201 shown in FIG. 1 or 2.

In one embodiment, the electronic device 630 (e.g. auditory device) may communicate with the external electronic device 610 (e.g. mobile device, mobile phone, or tablet computer). The electronic device 630 and the external electronic device 610 may be paired with each other through a number of protocols or methods, including via radio frequency (RF), Near-Field Magnetic Induction (NFMI), Bluetooth (BT), or Audio over Bluetooth Low Energy (AoBLE). For example, when the external electronic device 610 paired with the electronic device 630 is a mobile terminal, the electronic device 630 may receive audio information from the external electronic device 610, such as music played by the external electronic device 610, a call received thereby, an alarm generated thereby, or input from a first microphone 6163 thereof.

In one embodiment, it is possible to change configuration settings of the electronic device 630 via the external electronic device 610. Here, the electronic device 630 may not have its own display and may have a restricted input unit 6340 (e.g. the electronic device 630 may only have input buttons). The electronic device 630 may be a type of hearing aid and may include multiple filter mode volume settings (e.g. for Wide Dynamic Range Compression (WDRC)). In this case, when the user attempts to directly configure the mode or volume settings through the input unit 6340 (e.g. buttons), the user may be inconvenienced by the lack of a screen or restricted input methods. As a solution, when the electronic device 630 operates in cooperation with the external electronic device 610, the user may easily configure or change the settings of the electronic device 630 through the external electronic device 610. When the external electronic device 610 is a mobile terminal with a display and various input mechanisms (e.g. touch keys and buttons), the external electronic device 610 may provide a user interface (UI) for controlling the electronic device 630 and the user may easily change the settings of the electronic device 630 by use of the UI. For example, to change the volume of the electronic device 630, the user may generate touch input on the mobile terminal rather than directly manipulating the electronic device 630.

In one embodiment, the electronic device 630 may include a sensor unit 6320. The sensor unit 6320 may include a proximity sensor, acceleration sensor, geomagnetic sensor, and biometric sensor. The electronic device 630 may use the sensor unit 6320 to determine whether it is worn by the user. The electronic device 630 may configure the power control mode according to whether it is worn by the user or not. For example, when the electronic device 630 includes an acceleration sensor, it may monitor the movement of the user through the acceleration sensor and may operate in sleep mode if no movement is detected.

In one embodiment, when the electronic device 630 is connected to the external electronic device 610 (e.g. mobile device such as a mobile terminal or tablet computer), the electronic device 630 may deliver audio output from the electronic device 610 to the user. The electronic device 630 may reproduce audio stored in the external electronic device 610. The electronic device 630 may convert the received sound information into an audio or text file and store the audio or text file in the external electronic device 610. When the first microphone 6163 of the external electronic device 610 is configured as a remote microphone, the electronic device 630 may receive an audio signal picked up by the first microphone 6163 of the external electronic device 610. The audio signal received from the external electronic device 610 may be data compressed by a data compression scheme. The external electronic device 610 may send data to the electronic device 630 through a wireless communication unit 6110 (e.g. antenna). The electronic device 630 may receive the data through the wireless communication unit 6310 (e.g. antenna), extract audio data from the received data, decompress the audio data, and output the decompressed audio data to the second speaker 6351.

The electronic device 630 may receive an audio signal stored in the external electronic device 610 and reproduce the audio signal. For example, the external electronic device 610 may store a plurality of notification sounds. The external electronic device 610 may send the electronic device 630 different notification sounds according to user conditions, system states, points in time, message reception, email reception, and so forth. The electronic device 630 may extract audio data from received data, decompress the audio data, and output the decompressed audio data to the second speaker 6351 for reproduction of the notification.

The electronic device 630 may record a signal by using the external electronic device 610. The external electronic device 610 may store data in as compressed data. The external electronic device 610 may convert an audio signal into text data through a speech-to-text (STT) technique and store the text data. For example, the external electronic device 610 may apply speech-to-text conversion to a phone call on the electronic device 630 to store the phone conversation as a text file. Here, various information related to the phone call, for example, the time, sensor, and location may be added to the text file. The external electronic device 610 may display the stored conversation (i.e. the text file) on the display unit 6120. In one embodiment, the external electronic device 610 may convert text information into an audio signal through text-to-speech (TTS) conversion and send the audio signal to the electronic device 630. The electronic device 630 may output the audio signal received from the external electronic device 610 through the second speaker 6351.

The electronic device 630 may send the external electronic device 610 a signal picked up by the second microphone 6353. The external electronic device 610 may store the signal received from the electronic device 630. To reduce power consumption due to signal transmission, the electronic device 630 may send a signal containing compressed data to the external electronic device 610. The electronic device 630 may include a codec to compress and decompress audio data. The external electronic device 610 may receive a signal picked up by the second microphone 6353 of the electronic device 630, convert the receive signal into text data through STT conversion, and store the text data as a text file. The external electronic device 610 may output data stored or received from the electronic device 630 through the first speaker 6161.

In one embodiment, the electronic device 630 and the external electronic device 610 may provide the user with a call function through audio processing units 6350 and 6160 thereof (i.e. first microphone 6163 and first speaker 6161 of the external electronic device 610, and second microphone 6353 and second speaker 6351 of the electronic device 630).

In one embodiment, the electronic device 630 may form a network covering additional electronic devices connected with the external electronic device 610. For example, the electronic device 630 may exchange data with other electronic devices connected with the external electronic device 610, not shown in FIG. 6.

In one embodiment, the electronic device 630 or the external electronic device 610 may be one of various types of electronic devices having a microphone or a speaker. For example, as described before, the electronic device 630 or the external electronic device 610 may be a mobile terminal or auditory device. As another example, the electronic device 630 or the external electronic device 610 may be a smart glass with multiple microphones, a head mounted display (HMD), or a robot.

Figure 7:
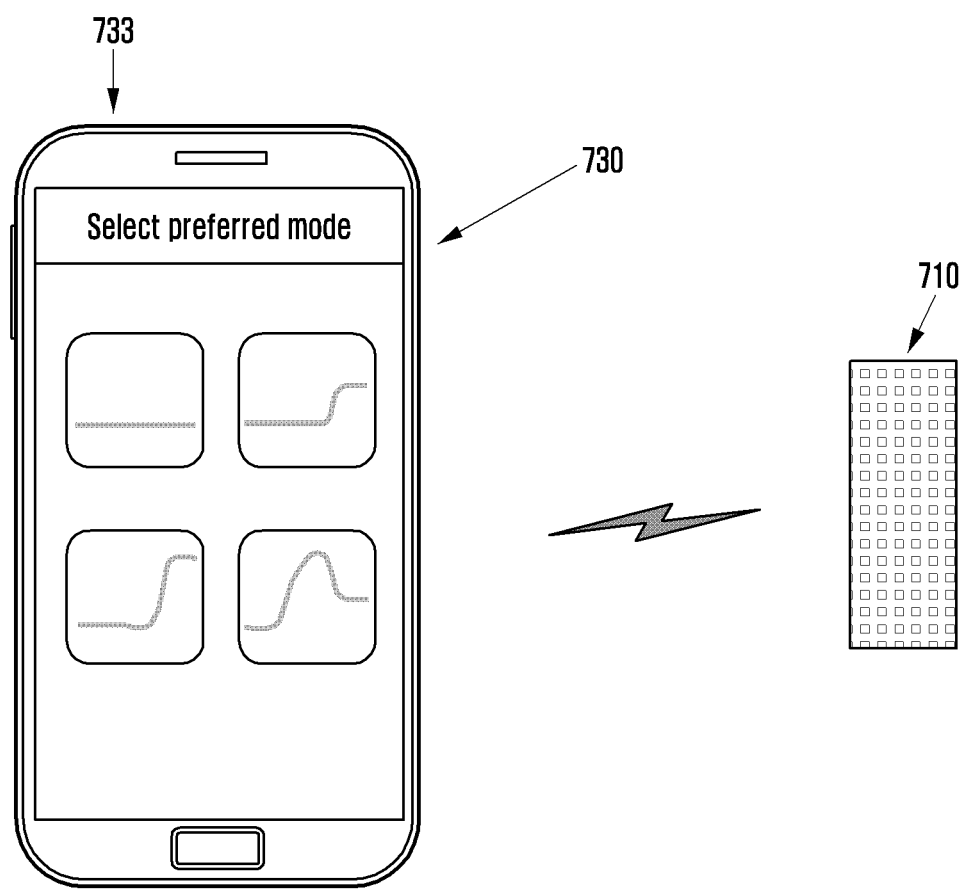
FIG. 7 illustrates interworking between the electronic device and the external electronic device according to one embodiment of the present disclosure.

FIG. 7 illustrates interworking between an electronic device 710 and an external electronic device 730 according to one embodiment of the present disclosure.

The electronic device 710 may use a microphone to pick up an external sound or audio input. The electronic device 710 may configure or change its settings according to user input through communication with the external electronic device 730. For example, the external electronic device 730 may store a configuration application for the electronic device 710. The external electronic device 730 may control the mode or volume of the electronic device 710 by use of the configuration application. The external electronic device 730 may display a list modes available to the electronic device 710 on the display unit. The external electronic device 730 may change the volume or mode of the electronic device 710 according to user input received through an input means (e.g. touchscreen). In one embodiment, the external electronic device 730 may set the mode of the electronic device 710 by use of various sensors (e.g. acceleration sensor, gyro sensor, biometric sensor, and proximity sensor) of the sensor unit of the external electronic device 730. For example, when the user shakes the external electronic device 730 left and right or up and down, the external electronic device 730 may sense this through the sensor unit. Upon sensing movement, the external electronic device 730 may send a corresponding input signal to the electronic device 710 so that the electronic device 710 can change the mode. As another example, the external electronic device 730 may use a biometric sensor (e.g. fingerprint sensor) so as to control the electronic device 710 to perform a mode transition according to biometric information of the user.

Figure 8:
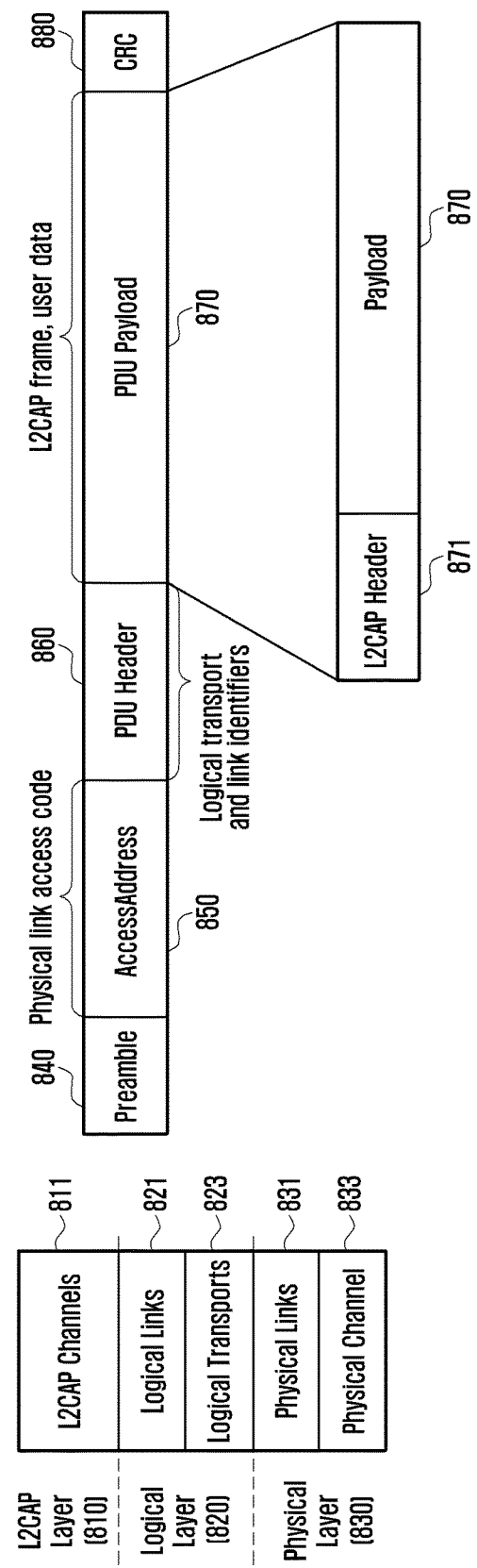
FIG. 8 illustrates a format for data exchange between the electronic device and the external electronic device according to one embodiment of the present disclosure.

FIG. 8 illustrates a format for data exchange between the electronic device 201 and the external electronic device according to one embodiment of the present disclosure.

In one embodiment, the electronic device 201 (e.g. auditory device) may communicate with the external electronic device by use of the data format shown in FIG. 8. The electronic device 201 may wirelessly communicate with the external electronic device. The electronic device 201 and the external electronic device may use, for example, the Bluetooth Low Energy (BLE) format for wireless communication. The electronic device 201 and the external electronic device may wirelessly communicate with each other by use of, for example, the Audio over BLE (AoBLE) format, which is a modified version of the BLE format for audio data.

In one embodiment, the electronic device 201 or the external electronic device may include Logical Link Control and Adaption Protocol (L2CAP) layer 810, Logical layer 820, and Physical layer 830. The L2CAP layer 810 may include L2CAP channels. The Logical layer 820 may include logical links 821 and logical transports 823. The Physical layer 830 may include physical links 831 and physical channels 833.

In one embodiment, the format may include multiple fields such as preamble 840, access address 850, Protocol Data Unit (PDU) header 860, PDU payload 870, and Cyclic Redundancy Check (CRC) 880.

The field for access address 850 may store a physical link access code. The field for PDU header 860 may store logical transport and link identifiers. The field for PDU payload 870 may store an L2CAP frame and user data. The field for PDU payload 870 may include fields for L2CAP header 871 and payload 873.

In one embodiment, the field for PDU payload 870 may be used to carry voice data and configuration data (such as codec sampling rate, frame size, activation indicator) to be exchanged between the electronic device 201 and the external electronic device. The field for L2CAP header 871 may store an operation code indicating the type of data.

Figure 9:
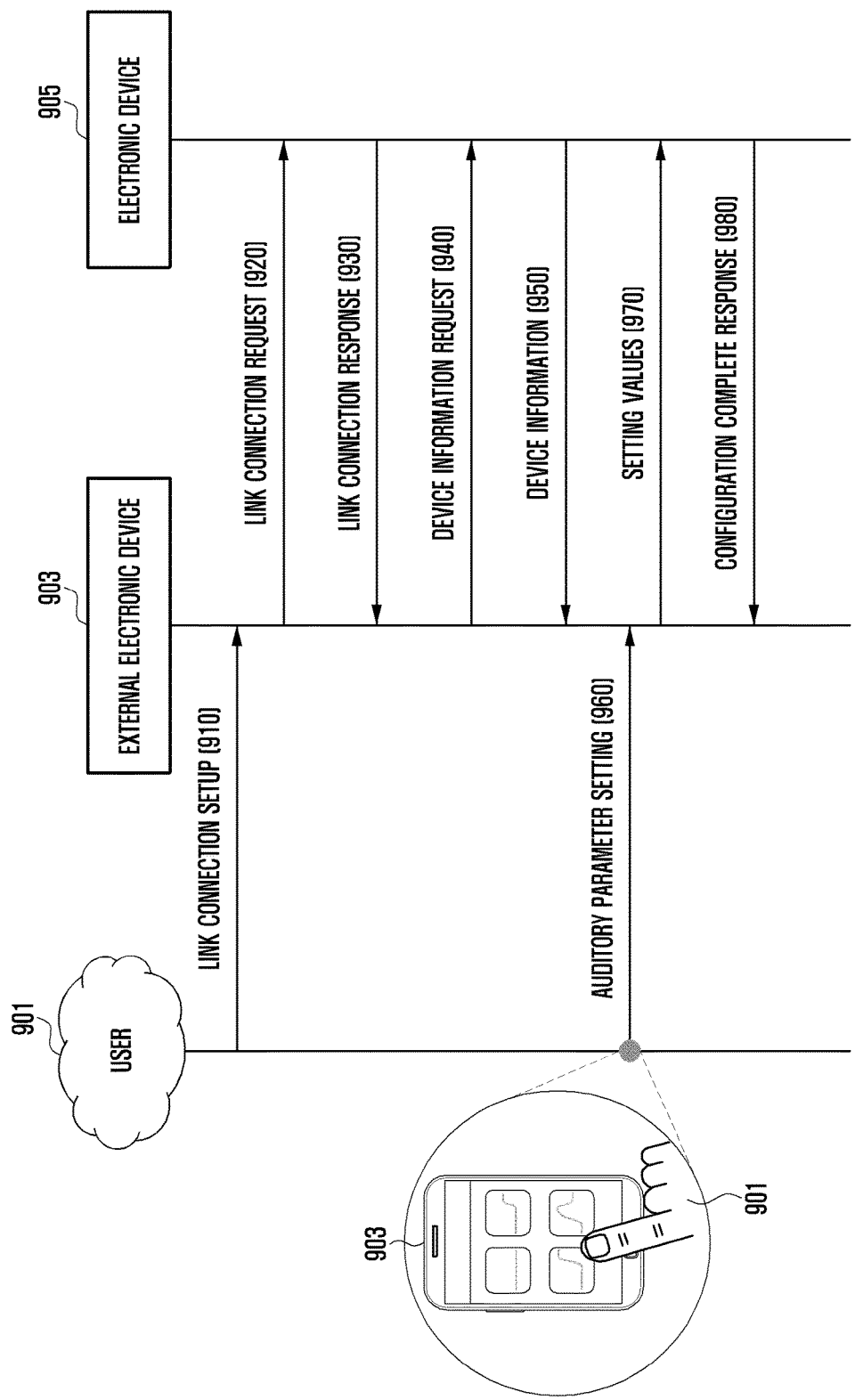
FIG. 9 illustrates signal flows between the electronic device and the external electronic device according to one embodiment of the present disclosure.

FIG. 9 illustrates signal flows between an electronic device 905 and an external electronic device 903 according to one embodiment of the present disclosure.

In one embodiment, the electronic device 905 (e.g. auditory device) may communicate with the external electronic device 903 (e.g. mobile terminal). The electronic device 905 may change configuration settings by using the external electronic device 903.

At operation 910, the external electronic device 903 receives input for establishing communication with the electronic device 905 (e.g. link connection setup) from the user 901. To this end, the external electronic device 903 may display a list of connectable devices including the electronic device 905 on the display unit. When user input for selecting the electronic device 905 is received, the external electronic device 903 may attempt to establish a communication connection to the selected device.

At operation 920, the external electronic device 903 sends a link connection request to the electronic device 905. The external electronic device 903 may send a link connection request to the electronic device 905 selected by user input.

In reply to the link connection request, at operation 930, the electronic device 905 sends a link connection response to the external electronic device 903. In one embodiment, upon establishing a link connection to the electronic device 905, the external electronic device 903 may display a UI notifying link establishment.

At operation 940, the external electronic device 903 sends a device information request to the electronic device 905. For example, the external electronic device 903 may request the electronic device 905 to send information on configuration settings related to, for example, modes and functions.

At operation 950, the electronic device 905 sends requested information to the external electronic device 903. For example, in response to the information request, the electronic device 905 may send configuration information to the external electronic device 903.

At operation 960, the external electronic device 903 receives input, for example auditory parameter settings, from the user 901. The external electronic device 903 may display mode information of the electronic device 905 or one or more auditory parameters available thereto. For example, the external electronic device 903 may display configuration settings of the electronic device 905 or auditory parameters available thereto on the basis of the information received from the electronic device 905. The external electronic device 903 may receive user input for selecting one or more of the displayed information elements.

At operation 970, the external electronic device 903 sends the electronic device 905 information on the mode or auditory parameter selected by the user 901. For example, the external electronic device 903 may send the electronic device 905 a mode setting value selected by the user 901.

At operation 980, the electronic device 905 sends a configuration complete response to the external electronic device 903. The electronic device 905 may update filter information of the audio processing means (e.g. codec) on the basis of the auditory parameter or mode setting value received from the external electronic device 903. For example, according to the received auditory parameter or mode setting value, the electronic device 905 may change the directionality for sound reception, the filter coefficients and cutoff frequency band (or pass frequency band) for sound information filtering, etc. After changing the configuration settings according to the received information, the electronic device 905 may send a configuration complete response to the external electronic device 903.

In one embodiment, according to the configured mode or auditory parameters, the electronic device 905 may pick up an external sound, process the picked up sound, and output the processed sound through the speaker (or receiver).

Figure 10:
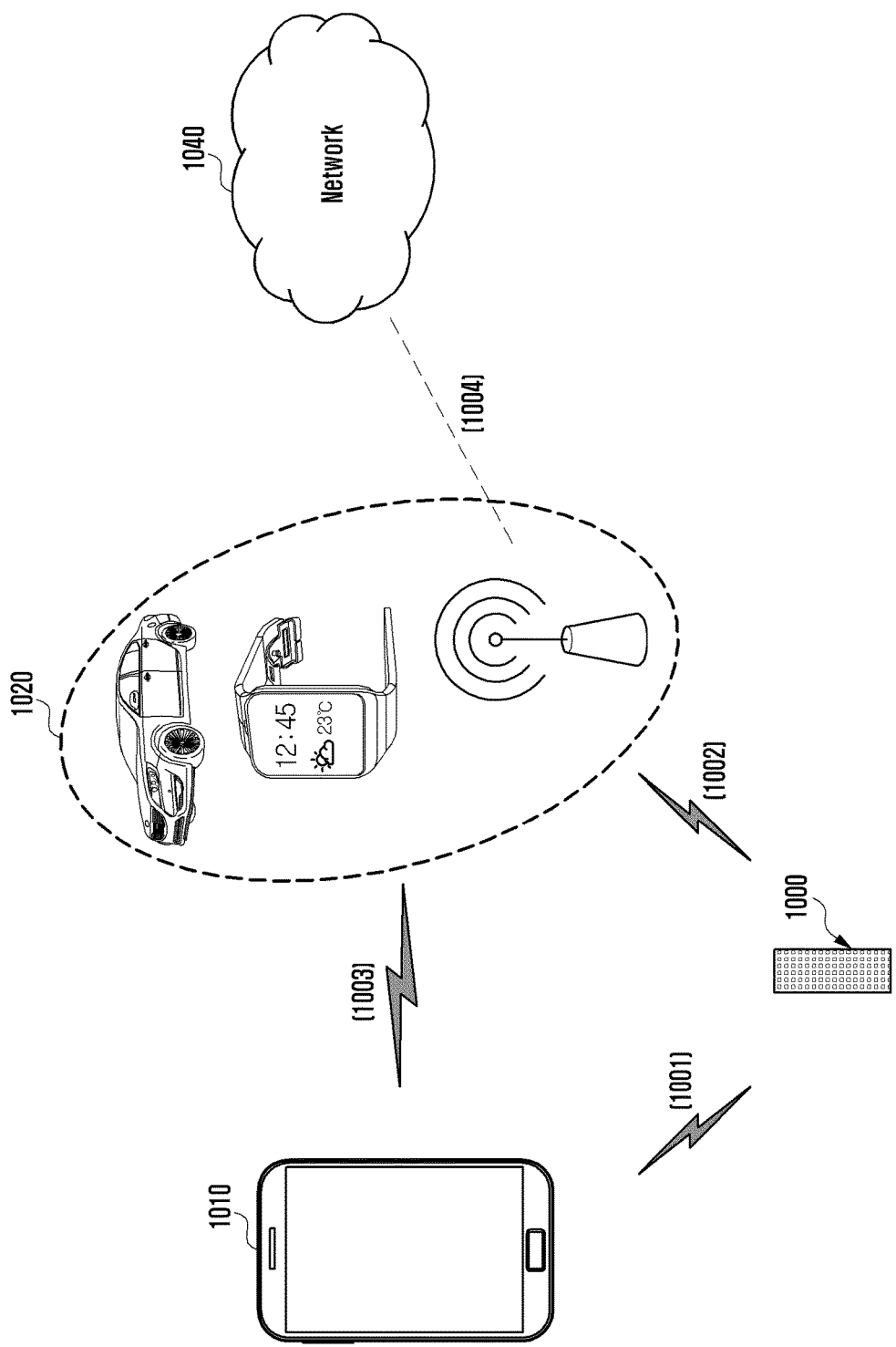
FIG. 10 illustrates communication between the electronic device and multiple external electronic devices according to one embodiment of the present disclosure.

FIG. 10 illustrates communication between an electronic device 1000 and multiple external electronic devices 1010 and 1020 according to one embodiment of the present disclosure.

In one embodiment, the electronic device 1000 may communicate with multiple external electronic devices (e.g. first external electronic device 1010 and second external electronic device 1020) or with a network 1040.

For example, the electronic device 1000 may connect to the first external electronic device 1010 through a first connection 1001. The electronic device 1000 may exchange data with the first external electronic device 1010. For example, the electronic device 1000 may configure audio filter information through the first external electronic device 1010. The electronic device 1000 may receive a command or data for setting audio filter information from the first external electronic device 1010.

The electronic device 1000 may connect to the second external electronic devices 1020 or the network 1040 via the first external electronic device 1010, and may exchange data with the first external electronic device 1010, the second external electronic devices 1020 or the network 1040. For example, the first external electronic device 1010 may be connected with the second external electronic device 1020 through a third connection 1003. The second external electronic devices 1020 may be connected with the network 1040 through a fourth connection 1004. The electronic device 1000 may use the first external electronic device 1010 as a relay terminal to exchange data with the second external electronic devices 1020 or the network 1040. In one embodiment, the electronic device 1000 may use a communication protocol provided by the first external electronic device 1010 to exchange data with the second external electronic devices 1020 or the network 1040. The first connection 1001 between the electronic device 1000 and the first external electronic device 1010 may be established based on NFMI or BLE. The third connection 1003 between the first external electronic device 1010 and the second external electronic devices 1020 or the network 1040 (including gateway-based connection) may be established based on Wi-Fi. The electronic device 1000 may send and receive data to and from the first external electronic device 1010 by use of NFMI or BLE, and the first external electronic device 1010 may send and receive data to and from the second external electronic devices 1020 or the network 1040 by use of Wi-Fi. The first external electronic device 1010 may forward data from the electronic device 1000 to the second external electronic devices 1020 or the network 1040. For example, the electronic device 1000 may download fitting data (or audio filter data) from the network 1040 via the first external electronic device 1010. As another example, the electronic device 1000 may receive audio data stored in the second external electronic devices 1020 via the first external electronic device 1010 and output the received audio data.

The electronic device 1000 may, as an alternative, connect to the second external electronic devices 1020 or the network 1040 through a second connection 1002. The electronic device 1000 may support communication standards enabling communication with the second external electronic devices 1020 or the network 1040. For example, the electronic device 1000 may support standards for telephone communication (e.g. 3G or LTE). The electronic device 1000 may connect to a base station and provide a call service to the user.

According to one embodiment of the present disclosure, an electronic device may include: one or more microphones configured to detect an external sound; a processor electrically coupled to the one or more microphones; and a memory electrically coupled to the processor. The memory may store instructions that cause, when executed, the processor to receive the detected external sound from the one or more microphones, to identify an direction of the external sound in relation to a user, to determine the direction of the external sound, and to transmit the external sound and determined direction information to an external device.

In one embodiment, the electronic device may further include: a housing having a coupling member removably attachable to an ear of a user; a communication circuit provided within the housing or on an external surface of the housing, and electrically coupled to the processor; and a speaker disposed within an opening of the housing and electrically coupled to the processor.

According to one embodiment of the present disclosure, an electronic device may include: a housing having a coupling member removably attachable to an ear of a user; one or more microphones within the housing and configured to detect an external sound; at least one speaker within the housing; at least one communication circuit within the housing; a processor within the housing and electrically coupled to the one or more microphones, the at least one speaker, and the at least one communication circuit; and at least one memory within the housing, and electrically coupled to the processor. The memory may store instructions that cause, when executed, the processor to receive the detected external sound from the one or more microphones, to identify an direction of the external sound in relation to the user, to determine whether the direction of the external sound is within a predefined range, and to extract at least a portion of the external sound for further processing when the direction of the external sound is within the predefined range.

In one embodiment, the at least one microphone may include a first microphone and a second microphone. The instructions may cause the processor to generate a first signal corresponding to a first sound detected by the first microphone, to generate a second signal corresponding to a second sound detected by the second microphone, and to determine whether the direction of the external sound is within the predefined range based on a result of a comparison between the first signal and the second signal.

In one embodiment, the instructions may cause the processor to store the extracted portion of the external sound in the memory during the further processing, or to send the extracted portion of the external sound to an external device via the communication circuit during the further processing.

In one embodiment, the electronic device may include a first microphone and a second microphone, where the first microphone and the second microphone are placed at different locations within the housing.

In one embodiment, the instructions may cause the processor to determine an angle corresponding to the predefined range for the determination of whether the direction of the external sound is within the predefined range.

In one embodiment, the instructions may cause the processor to convert the extracted portion of the external sound into text data, and to store the text data in the memory or transmit the text data to an external device via the communication circuit during the further processing.

In one embodiment, the electronic device may further include a display electrically connected with the processor. The instructions may cause the processor to apply a selected highlighting effect to at least a portion of the text data according to a selected criteria, and to control the display to display the portion of the text data with the selected highlighting effect during the further processing.

In one embodiment, the selected criteria are selected based on at least one of: whether the direction of the external sound is within the predefined range, whether at least a portion of the external sound matches a voice of the user, whether a volume of the external sound is higher than or equal to a preset threshold, whether a selection signal is received from an external device, and whether a portion of the text data matches one or more predetermined words.

The selected highlighting effect is at least one of: a bold font, a shading, an italic font, a change of color, an insertion of a punctuation mark, a replacement of at least a portion of the text data with an icon, and a change of font.

In one embodiment, the instructions may cause the processor to apply no highlighting effect to the text data when the direction of the external sound is not within the predefined range.

In one embodiment, the predefined range is selected by user input entered in an external device and transmitted from the external device to the electronic device According to one embodiment of the present disclosure, an electronic device may include: a communication module; a processor electrically coupled to the communication module; and a memory electrically coupled to the processor. The memory may store instructions that cause, when executed, the processor to receive a sound detected by an external device and information on a direction of the sound from the external device, to determine whether the direction of the sound is within a predefined range, and to extract at least a portion of the sound for further processing when the direction of the sound is within the predefined range.

According to one embodiment of the present disclosure, an electronic device may include: a first microphone; a processor electrically coupled to the first microphone; and a memory electrically coupled to the processor. The memory may store instructions that cause, when executed, the processor to detect a first sound using the first microphone, to receive, from an external device, information on a direction of a second sound detected by a second microphone of the external device, and to extract at least a portion of the first sound for further processing based on the information on the direction of the second sound.

According to one embodiment of the present disclosure, an electronic device may include: a housing having a coupling member removably attachable to an ear of a user; one or more microphones within the housing, and configured to detect an external sound; at least one speaker within the housing; at least one communication circuit within the housing; a processor within the housing, and electrically coupled to the one or more microphones, the at least one speaker, and the at least one communication circuit; and at least one memory placed in the housing, and electrically coupled to the processor. The memory may store instructions that cause, when executed, the processor to identify a direction of the external sound in relation to the user, to generate information on the direction of the external sound, and to send the generated information to an external device via the at least one communication circuit.

According to one embodiment of the present disclosure, an electronic device may include: a communication module; a processor electrically coupled to the communication module; and a memory electrically coupled to the processor. The memory may store instructions that cause, when executed, the processor to receive data corresponding a sound from a first external device, to receive information on a direction of the sound from a second external device, to determine whether the direction of the sound is within a predefined range, and to extract at least a portion of the data corresponding to the sound for further processing when the direction of the sound is within the predefined range.

According to one embodiment of the present disclosure, an electronic device may include: a display to display a virtual environment; at least one speaker to output audio toward an ear of a user; a processor electrically coupled to the display and the at least one speaker; and a memory electrically coupled the processor. The memory may store instructions that cause, when executed, the processor to identify a location of the user in a virtual environment, to locate at least one sound source in the virtual environment, to determine whether the at least one sound source is within a predefined range in relation to the location of the user in the virtual environment, and to extract at least a portion of audio data produced by the sound source for further processing when the at least one sound source is within the predefined range.

In one embodiment, the instructions may cause the processor to further process the extracted portion of the audio data by converting the extracted portion of the audio data into text data, and storing the text data in the memory.

In one embodiment, the instructions may cause the processor to further process the extracted portion of the audio data by applying a selected highlighting effect to at least a portion of the text data according to a selected criteria.

In one embodiment, the selected criteria are selected based at least one of: whether the at least one sound source is within the predefined range, whether at least a portion of the extracted portion of audio data matches a voice of the user, whether a volume of the extracted portion of audio data is higher than or equal to a preset threshold, whether a selection signal is received from an external device, and whether a portion of the text data matches one or more predetermined words.

In one embodiment, the selected highlighting effect is at least one of: a bold font, a shading, an italic font, a change of color, an insertion of a punctuation mark, a replacement of at least a portion of the text data with an icon, and a change of font.

In one embodiment, the instructions may cause the processor to store the text data with additional information about the text data in the memory.

In one embodiment, the additional information comprises at least one of time information, location information, sensor information, and image information associated with the text data.

Figure 11:
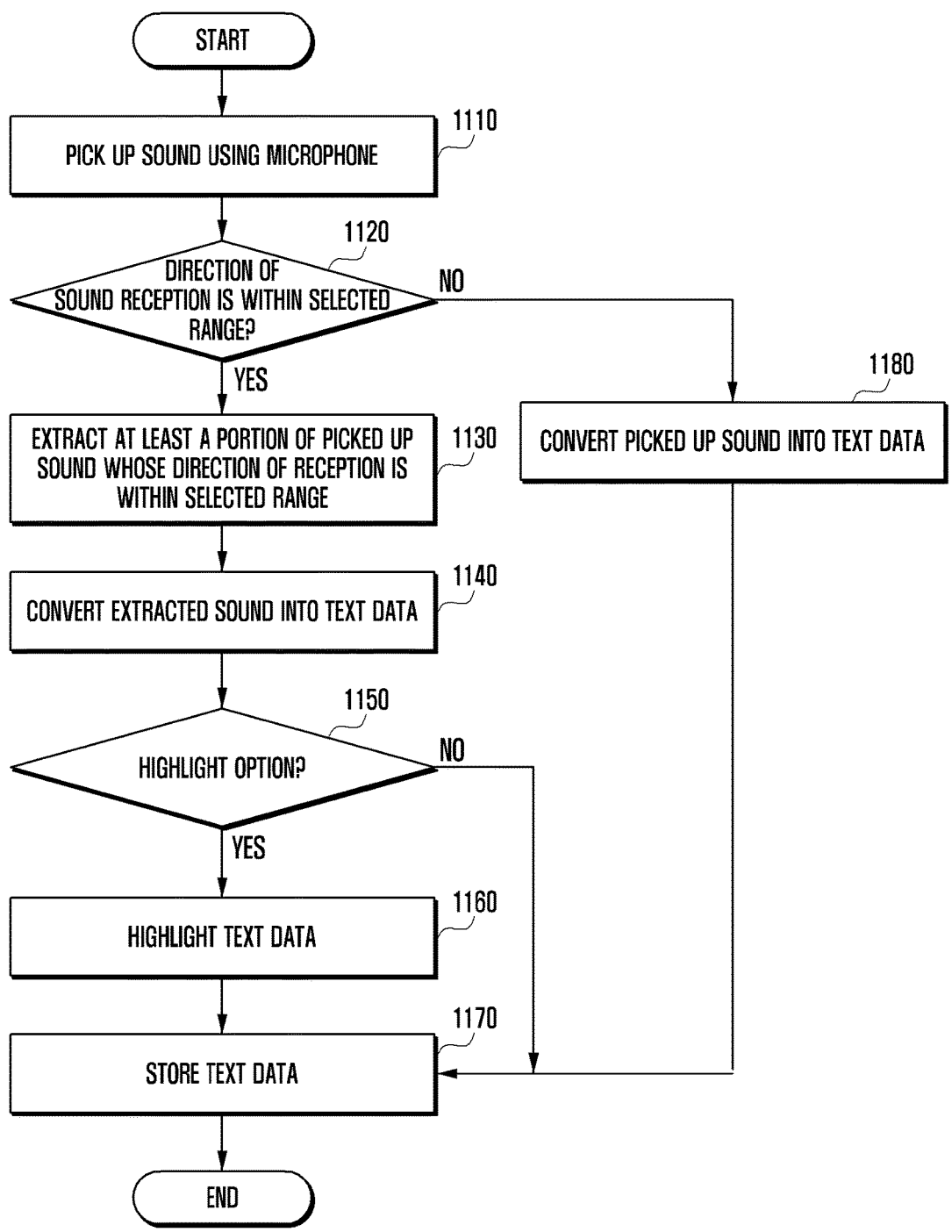
FIG. 11 is a flowchart of a procedure for operation control in the electronic device according to one embodiment of the present disclosure.

FIG. 11 is a flowchart of a procedure for operation control in the electronic device according to one embodiment of the present disclosure.

At operation 1110, the electronic device picks up a sound using a microphone. The electronic device may include one or more microphones. The electronic device may pick up an external sound and temporarily store the picked up sound in the memory.

At operation 1120, the electronic device determines whether the direction of the sound is within a predefined range. For example, the electronic device may identify the direction of the sound by analyzing the difference between the times when the sound arrives at individual microphones. In one embodiment, the electronic device may designate a specific range of directions as a predefined range. For example, the electronic device may select a range in a specific direction according to user input. The electronic device may select a first direction and a second direction according to user input, and designate the region between the first direction and the second direction as the range for determining the direction of sound reception.

The electronic device may determine whether the direction of the sound is at least partially within the predefined range. If the direction of the sound is within the predefined range, the procedure proceeds to operation 1130. If the direction of the sound is not within the predefined range, the procedure proceeds to operation 1180.

At operation 1130, the electronic device extracts at least a portion of the picked up sound whose direction is within the predefined range.

At operation 1140, the electronic device converts the extracted sound into text data. The electronic device may convert the extracted sound into text data through, for example, speech-to-text (STT) conversion.

At operation 1150, the electronic device checks whether a highlight option is set for the text data. The electronic device may set a highlight option for text data according to user input. If a highlight option is set, the procedure proceeds to operation 1160. If a highlight option is not set, the procedure proceeds to operation 1170.

At operation 1160, the electronic device applies a highlight effect to the text data according to the highlight option. The electronic device may apply a highlight effect preset or selected by user input to the text data. The highlight effect may be used to highlight contents of text data, and may a bold font, a shading, an italic font, a change of color, an insertion of a punctuation mark, or replacing a specific word or phrase with an icon. For example, the electronic device may insert punctuation marks such as parentheses at the beginning and end of the text. The electronic device may change the font of the text. When a specific word is present in the text, the electronic device may replace the word with a specific icon.

In one embodiment, the electronic device may apply a highlight effect to the text data according to selected criteria. Here, the selected criteria may be related to at least one of whether the direction of the sound is within the predefined range, whether at least a portion of the sound matches the voice of the user, whether the level of the sound is higher than or equal to a preset threshold, whether a selection signal is received from an external device, and whether a portion of the text data matches a given word.

For example, when at least one of the selected criteria is satisfied, the electronic device may apply a highlight effect to the text data and store the highlighted text data.

At operation 1170, the electronic device stores the text data. The electronic device may store the text data together with the extracted sound before STT conversion. The electronic device may store the text data together with additional information. For example, the additional information may include information regarding the time at which the sound is picked up, the time at which the sound is converted into text data, the location, the sensor, related images, related electronic books, persons involved, or camera-captured images.

If the direction of sound reception is not within the predefined range, at operation 1180, the electronic device extracts at least a portion of the picked up sound whose direction of reception is not within the predefined range and converts the extracted sound into text data. At operation 1170, the electronic device stores the text data.

In one embodiment, when the direction of sound reception is not within the predefined range, the electronic device may skip operation 1180 and operation 1170. That is, the electronic device may extract at least a portion of the picked up sound whose direction is within the predefined range and convert the extracted sound into text data, and may not convert a portion of the picked up sound whose direction is not within the predefined range into text data.

In one embodiment, the electronic device may convert all of the picked up sound into text data and apply a highlight effect to only a portion of the text data corresponding to the direction of sound within the predefined range.

In one embodiment, the electronic device may detect a speech signal of a specific person or an audio signal of a desired object. The electronic device may set a specific direction, and record and process (e.g. amplify) an audio signal with emphasis on the specified direction. The electronic device may increase the input sensitivity for an audio signal coming from the specified direction. The electronic device may configure and change the microphone sensitivity with respect to the specified direction.

In one embodiment, the electronic device may set a specific direction, and selectively receive and store an audio signal coming from the specified direction. The electronic device may convert a received audio signal into text data through speech-to-text conversion and store the text data.

In one embodiment, the electronic device may recognize an audio signal of a specific object. For example, in the event that different sounds (e.g. dog's barking, traffic noise on the road, water sound, clapping sound) are classified and stored in a database in advance, when a picked up sound matches one of those stored in the database, the electronic device may generate text data corresponding to the sound or add an emoticon corresponding to the sound to text data.

In one embodiment, the electronic device may record time information with timestamps, or may store converted text data together with GPS information indicating the location of the user. The electronic device may select a portion of the picked up sound to be highlighted in accordance with a detected gesture or a sound level (i.e. volume) of the user. For example, the electronic device may sense an action or gesture of the user by use of a sensor. After sensing an action or gesture, the electronic device may pick up the sound, convert the sound into text data, apply a highlight effect to the text data, and store the highlighted text data.

In one embodiment, the electronic device may recognize the speaker or talker. For example, the electronic device may analyze a received speech signal to identify the voice of a specific person. The electronic device may selectively store a speech signal of a specific person or convert the same into text data. For example, the electronic device may recognize the voice of the user, and may convert a speech signal of the user into text data, apply a highlight effect to the text data, and store the highlighted text data. When the electronic device is an auditory device, the electronic device may recognize that the user is speaking by using a bone motion sensor sensing the bone movement while talking. In one embodiment, through the feature of picking up a speech signal of the user, converting the speech signal into text data, and storing the text data, the electronic device may generate a memo when the user is reading an e-book, or add sound data or text data as metadata to a photograph at the time of photo shooting.

In one embodiment, the electronic device may send stored data to an external device. For example, the electronic device may send data or text data regarding stored sounds to the external device (e.g. mobile terminal). The electronic device may send an external sound picked up and/or information on the picked up sound (e.g. direction of sound reception) to the external device.

Figure 12:
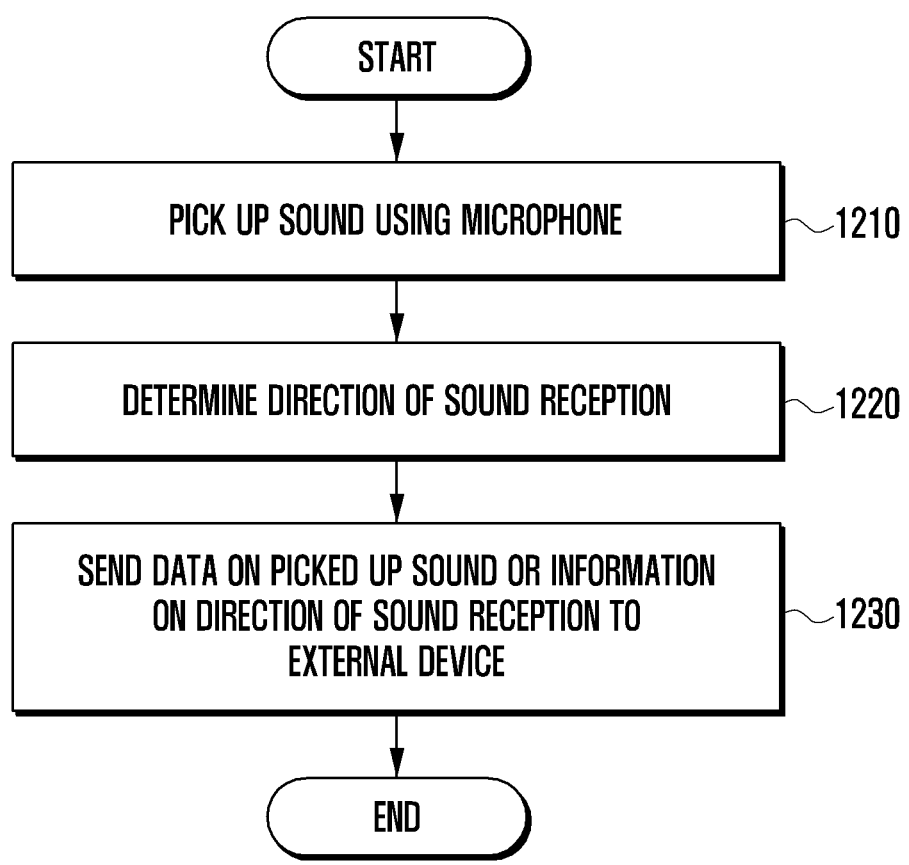
FIG. 12 is a flowchart of a procedure for operation control in the electronic device according to one embodiment of the present disclosure.

FIG. 12 is a flowchart of a procedure for operation control in the electronic device according to one embodiment of the present disclosure.

At operation 1210, the electronic device picks up a sound. The electronic device may generate data on the picked up sound. The electronic device may process the picked up sound (e.g. conversion or amplification) and generate data on the picked up sound.

At operation 1220, the electronic device identifies the direction of reception of the picked up sound. For example, when the electronic device includes multiple microphones, it may identify the direction of sound reception by analyzing the difference between the times when the sound arrives at the individual microphones.

At operation 1230, the electronic device sends data on the picked up sound or information on the direction of sound reception to an external electronic device.

In one embodiment, the electronic device may perform either operation 1210 or operation 1220. For example, the electronic device may either pick up a sound and generate data on the picked up sound, or identify the direction of sound reception and generate information on the identified direction. The electronic device may send either data on the picked up sound or information on the direction of the sound to the external electronic device.

Figure 13:
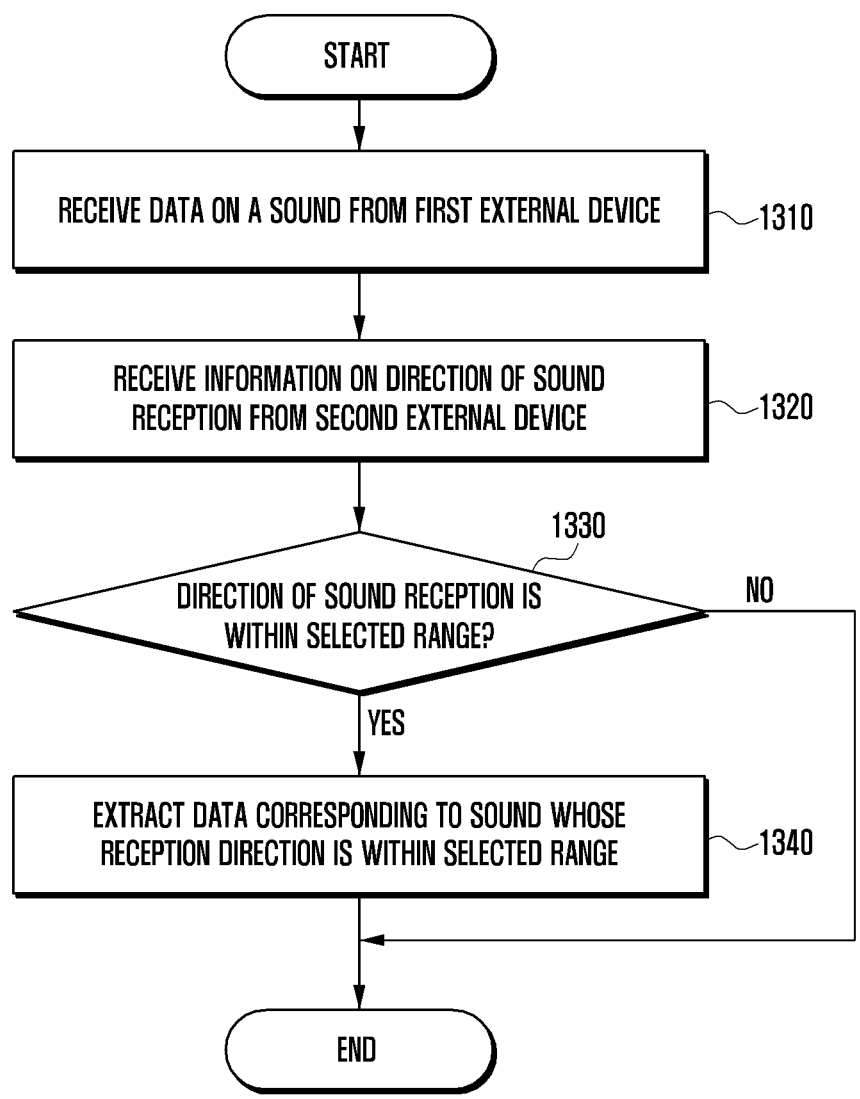
FIG. 13 is a flowchart of a procedure for operation control in the electronic device according to one embodiment of the present disclosure.

FIG. 13 is a flowchart of a procedure for operation control in the electronic device according to one embodiment of the present disclosure.

At operation 1310, the electronic device receives data of a sound (i.e. audio data) from a first external device. For example, the electronic device may receive data on a sound picked up by an auditory device from a mobile terminal.

At operation 1320, the electronic device receives information on the direction of the sound from a second external device. For example, the electronic device may receive information on the direction of sound reception from an auditory device (e.g. hearing aid).

In one embodiment, the first external device may generate data on a sound only, and the second external device may generate information on the direction of the sound only for the same sound.

At operation 1330, the electronic device determines whether the direction of the sound is within a predefined range on the basis of the received data and the received information. For example, the electronic device may determine whether the direction of the sound received by the first external device is within the predefined range on the basis of the received directional information from the second electronic device.

At operation 1340, the electronic device extracts data corresponding to the sound whose reception direction is within the predefined range. In one embodiment, as shown in FIG. 12, the electronic device may extract data corresponding to the sound whose reception direction is within the predefined range, convert the extracted data into text data, apply a highlight effect to the text data, and store the highlighted text data.

Figure 14:
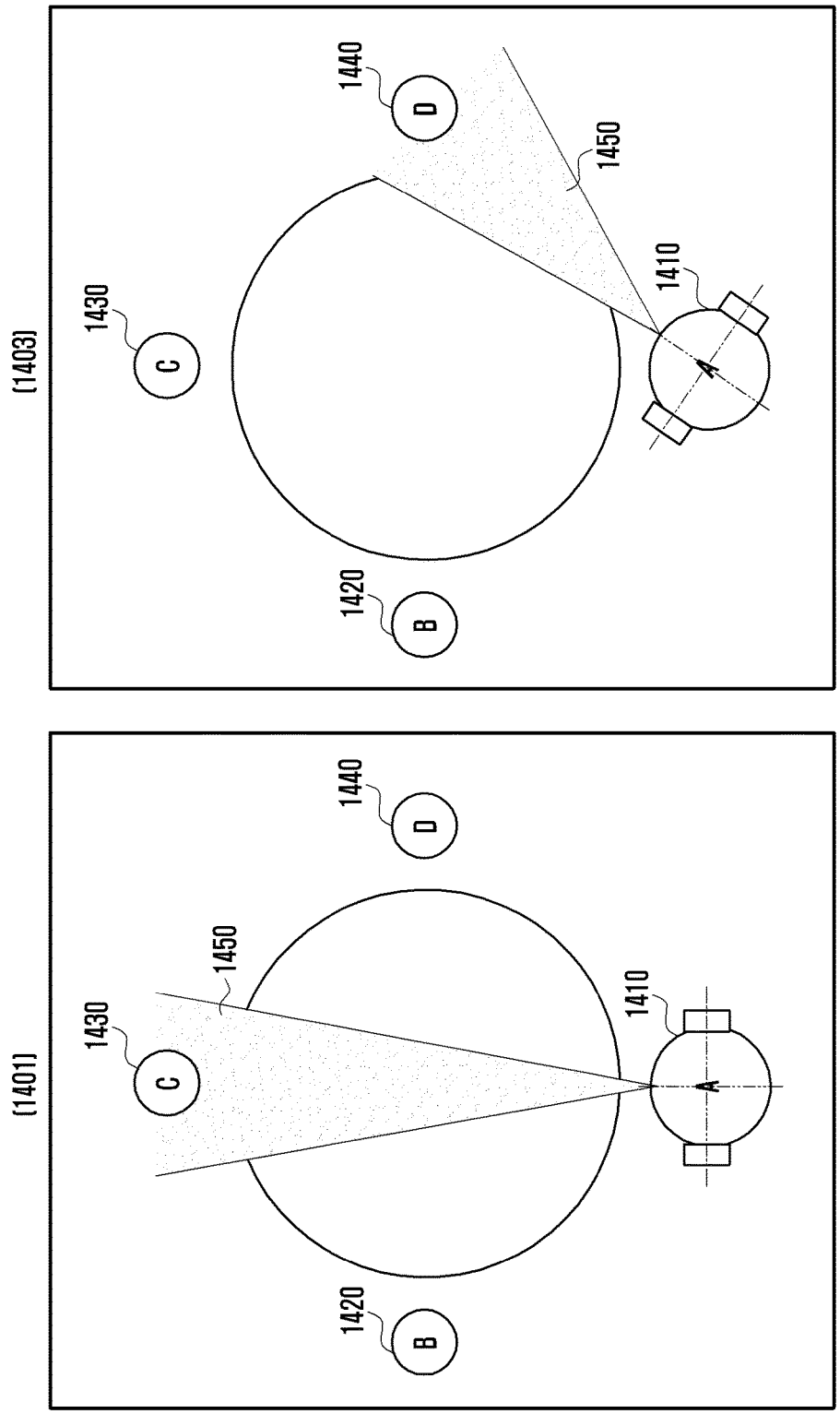
FIG. 14 illustrates operations of the electronic device according to one embodiment of the present disclosure.

FIG. 14 illustrates operations of the electronic device according to one embodiment of the present disclosure. In the description of FIG. 14, it is assumed that the user 1410 is using (e.g. wearing) the electronic device (e.g. auditory device).

In an environment where multiple sound sources are present, the electronic device may set a directivity indication to process audio signals. For example, as indicated by image 1401, a meeting is in progress around the round table. Here, the electronic device may set a directivity indication to the direction of the speaker C 1430 as the speaker C 1430 is of interest to the user A 1410. For example, the directivity indication may be set by the user A 1410 gazing at the speaker C 1430. After setting a directivity indication to the direction of the speaker C 1430, the electronic device may pick up a speech signal of the speaker C 1430 and store the picked up speech signal. The electronic device may convert the picked up speech signal into text data through speech-to-text (STT) conversion and store the text data. As indicated by image 1403, when the directivity indication is changed from the direction of the speaker C 1430 to the direction of the speaker D 1440 (the speaker D 1440 is now of interest to the user A 1410), the electronic device may pick up a speech signal of the speaker D 1440 and store the picked up speech signal.

In one embodiment, the electronic device may set a directivity indication to a particular direction. The electronic device may pick up and store a sound coming from the specified direction (a predefined range with respect to the direction). The electronic device may select a sound coming from the specified direction among sounds coming from all directions, convert the picked up sound into text data, highlight the text data, and store the highlighted text data.

In one embodiment, the electronic device may treat sounds whose reception direction is within a specified or predefined range as a group. For example, the electronic device may recognize at least one speaker present in the predefined range by analyzing picked up sounds. The electronic device may regard speakers present in the predefined range as a group. That is, the electronic device may regard sounds whose reception direction is within the predefined range as sounds coming from one group. For example, the electronic device may divide sounds coming from the outside into one or more groups. For each group, the electronic device may pick up sounds coming from the group and store the picked up sounds, or convert the picked up sounds into text data and highlight the text data or sends the text data to an external device.

Figure 15:
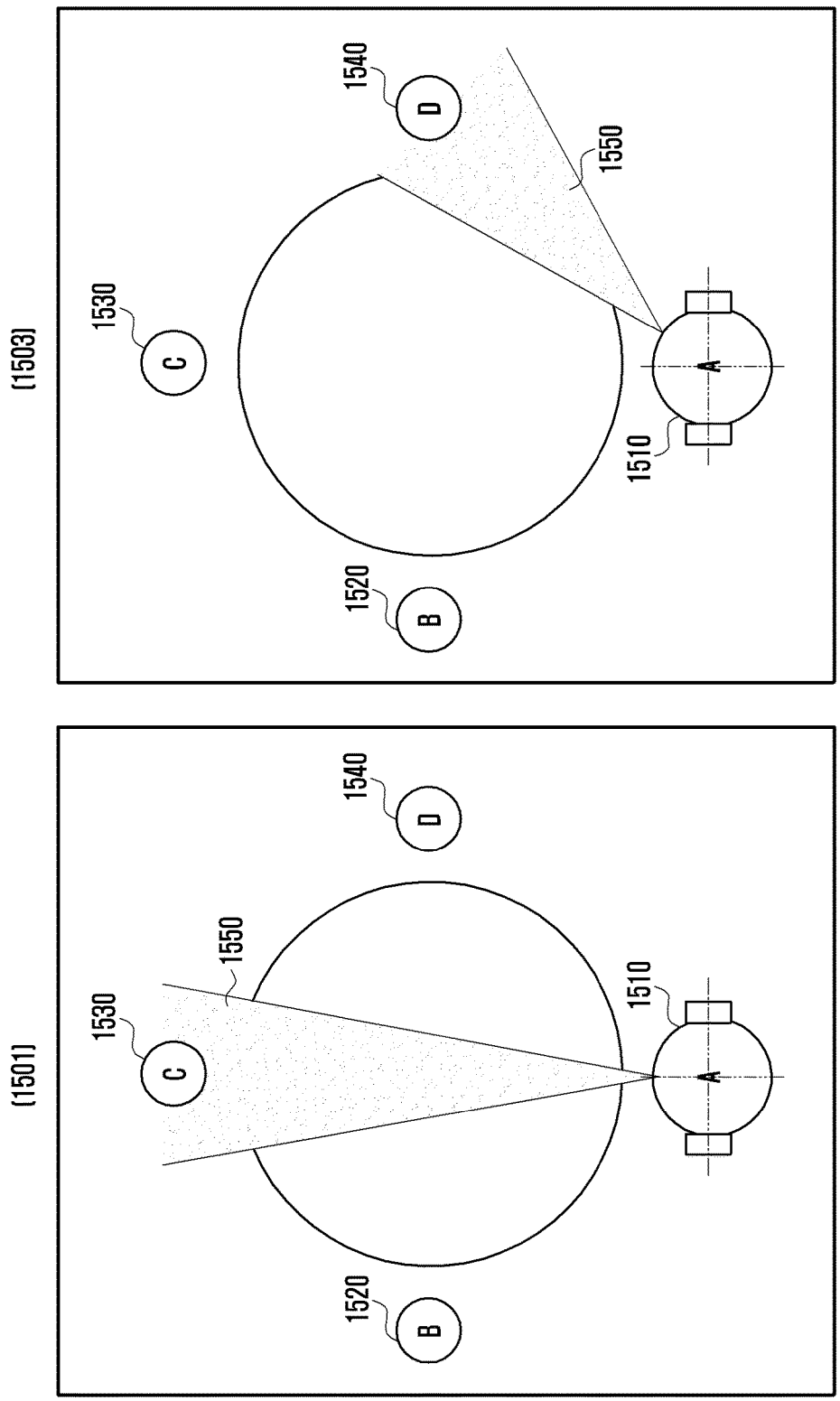
FIG. 15 illustrates operations of the electronic device according to one embodiment of the present disclosure.

FIG. 15 illustrates operations of the electronic device according to one embodiment of the present disclosure. In the description of FIG. 15, it is assumed that the user 1510 is using (wearing) the electronic device (e.g. auditory device).

In one embodiment, the electronic device may change the directivity indication to process audio signals. For example, as indicated by image 1501, a meeting is in progress around the round table. Here, the electronic device may set a directivity indication to the direction of the speaker C 1530 according to selection of the user A 1510. That is, the directivity indication may be set to the front direction of the user, and to the direction of the speaker C 1530. Thereafter, the speaker of interest to the user A 1510 may change while the gaze direction of the user A 1510 is maintained toward the speaker C 1530. In this case, as indicated by image 1503, the electronic device may turn the directivity indication 45 degrees to the right (to the direction of the speaker D 1540) while the gaze direction of the user A 1510 is fixed. In one embodiment, the electronic device may change or turn the directivity indication according to user input, a signal from an external device, or a signal sensed by a sensor.

The electronic device may pick up a speech signal of the speaker D 1540 and store the picked up speech signal. The electronic device may convert the picked up speech signal into text data through speech-to-text (STT) conversion and store the text data. The electronic device may highlight the text data and store the highlighted text data.

In one embodiment, the electronic device (e.g. auditory device) may change the directivity indication in cooperation with an external electronic device (e.g. mobile terminal). For example, the electronic device may be connected with the external electronic device through a communication link. The external electronic device may display a user interface enabling the user to control functions of the electronic device. For example, the external electronic device may store an application for controlling the directivity of the electronic device. The external electronic device may receive user input for controlling functions or operations of the electronic device through a user interface (e.g. application). To change the directivity of the electronic device, the external electronic device may send the electronic device data or signal corresponding to the user input. The electronic device may change the directivity indication according to the data or signal received from the external electronic device. For example, the external electronic device may execute an application related to the electronic device and display a corresponding screen on the display. During application execution, the external electronic device may receive user input for changing the directivity indication of the electronic device from the direction of the speaker 1430 in front to the direction of the speaker 1440 at the side. The external electronic device may send the electronic device the received user input or data or signal corresponding thereto. The electronic device may change the directivity indication from the front direction to the side direction according to the data or signal received from the external electronic device.

In one embodiment, the electronic device may set the directivity indication according to user selection. The electronic device may set the directivity indication according to collected sensor data or data sent by an external device having received user input. For example, the electronic device (e.g. auditory device) may set the directivity indication according to user input recognized through head tracking, speech recognition, button press, or other suitable user or sensor input, as can be appreciated by one of ordinary skill in the art. As another example, the electronic device may set the directivity indication according to information sent by an external electronic device (e.g. mobile terminal, or wearable device) having received user input such as a touch event or gesture event.

Figure 16:
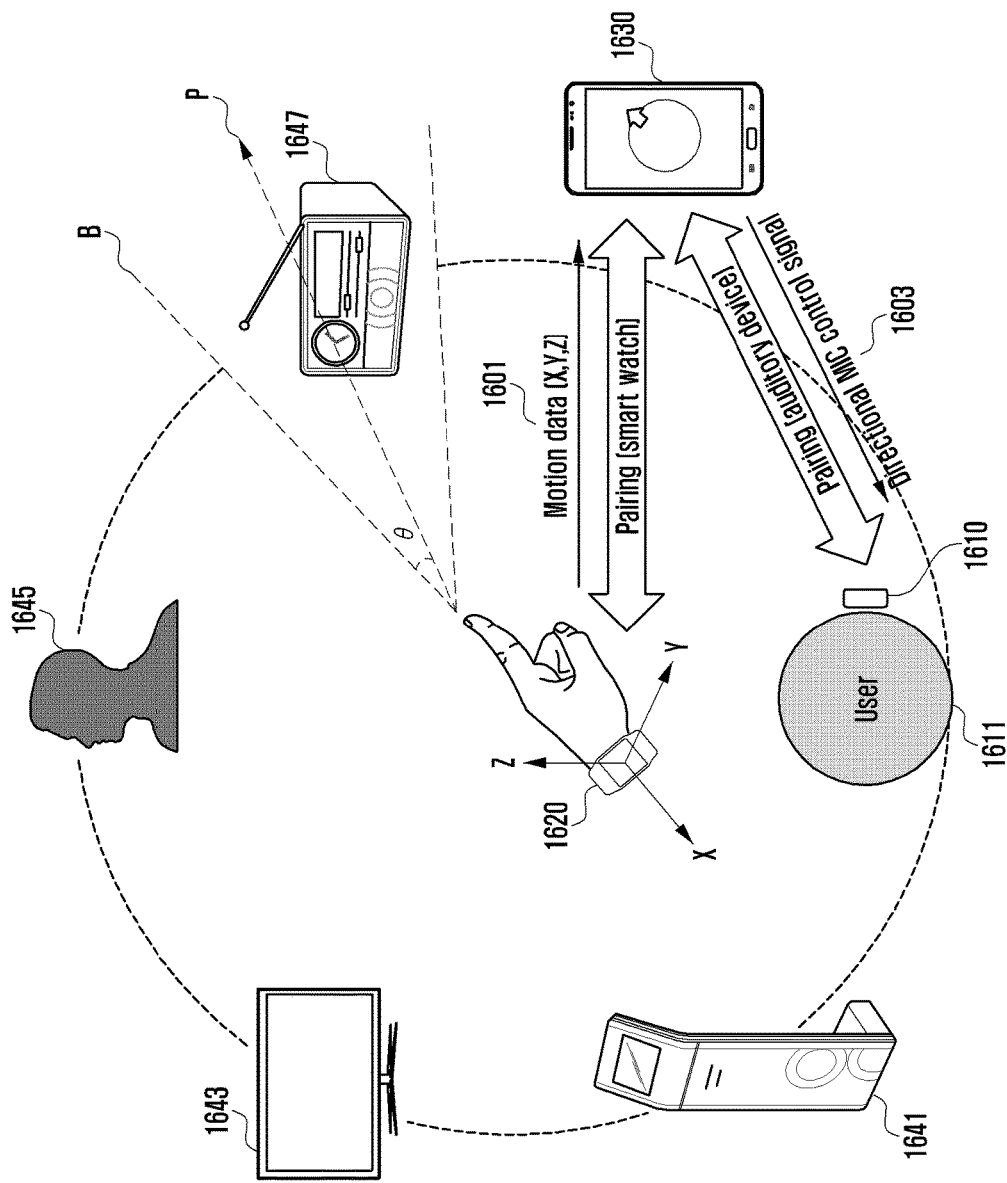
FIG. 16 illustrates operations of the electronic device according to one embodiment of the present disclosure.

FIG. 16 illustrates operations of an electronic device 1610 according to one embodiment of the present disclosure.

In one embodiment, the electronic device 1610 may change the directivity indication in cooperation with other electronic devices. For example, the electronic device 1610 and a wearable device 1620 (e.g. smartwatch) may be paired with a mobile device 1630 (e.g. smartphone). In the vicinity of the user 1611 of the electronic device 1610, there may be various sound sources (e.g. speaker 1641, TV 1643, person 1645, radio 1647, and digital signage). In one embodiment, when the user 1611, wishing to select a desired sound source, raises one hand and points to a specific sound source with a finger, the smartwatch 1620 on the wrist of the user 1611 may sense this motion. Motion data sensed by the smartwatch 1620 may be sent to the smartphone 1630 (operation 1601). Upon reception of the motion data, the smartphone 1630 may generate a control signal for directivity (i.e. direction range) and send the control signal to the electronic device 1610 (operation 1603). Upon reception of the directivity control signal, the electronic device 1610 may pick up a sound coming from the indicated direction, convert the picked up sound into text data, highlight the text data, and store the highlighted text data.

In one embodiment, the electronic device 1610 may consider a sector of a given angle with respect to the pointing axis of the smartwatch 1620 as a range of directions. The smartphone 1630 may identify the direction of the pointing axis on the basis of motion data received from the smartwatch 1620 and send a directivity control signal indicating the pointing axis direction to the electronic device 1610. Upon reception of the directivity control signal, the electronic device 1610 may pick up an audio signal coming from a sound source in the direction indicated by the smartwatch 1620. The electronic device 1610 may extract only a sound coming from the direction indicated by the smartwatch 1620 among the ambient sounds around the electronic device 1610. The electronic device 1610 may convert the extracted sound into text data, highlight the text data, and store the highlighted text data.

In one embodiment, the electronic device 1610 may adjust directivity control parameters on the basis of signals received from external devices 1620 and 1630 so as to set the directivity indication to the direction of interest to the user. The electronic device 1610 may identify the direction of an object of interest to the user by use of various sensors of the external devices (e.g. geomagnetic sensor, image sensor, and acceleration sensor), and set the directivity indication to the direction of interest (e.g. adjust functions of directional microphones).

Figure 17:
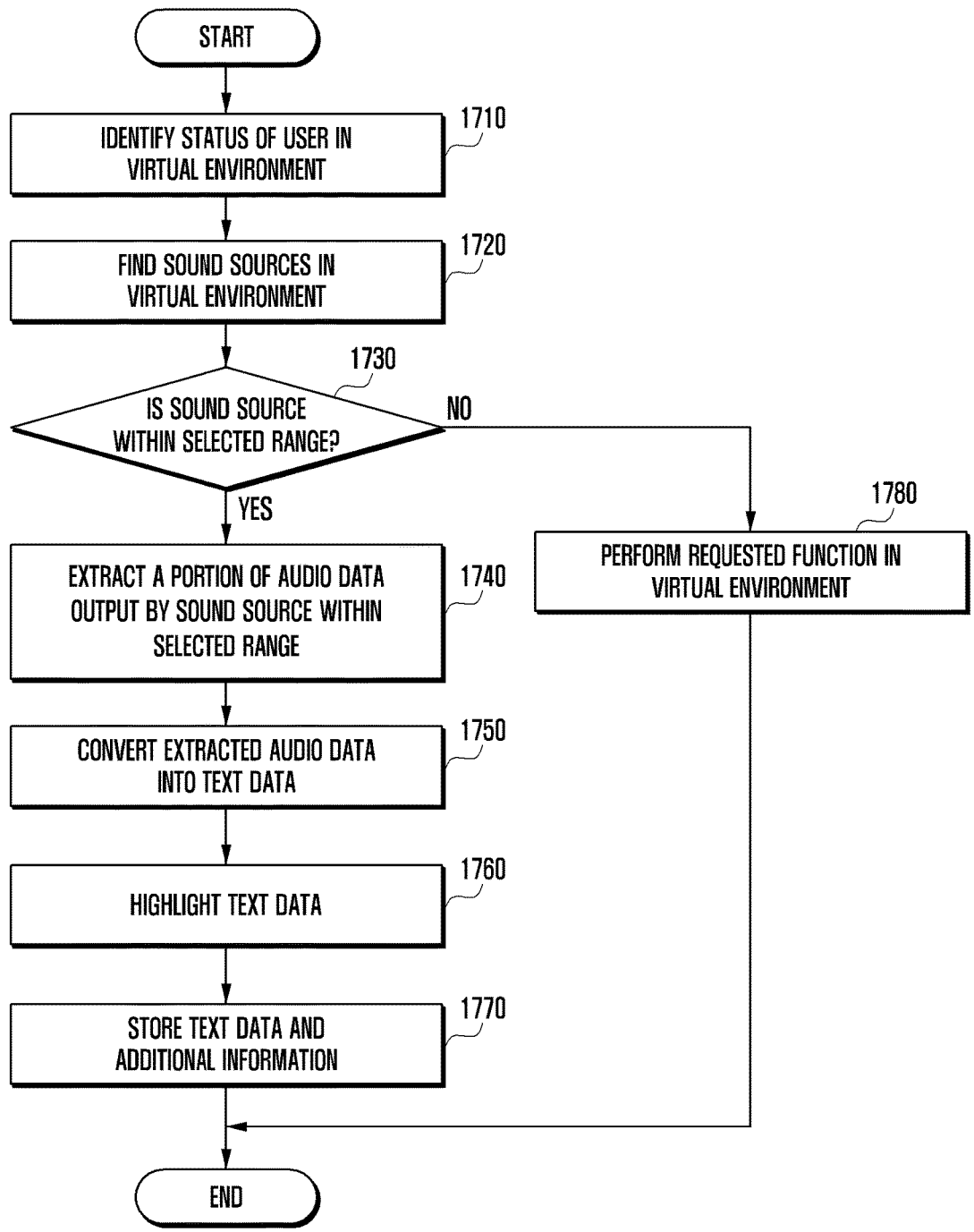
FIG. 17 is a flowchart of a procedure for operation control in an auditory device according to one embodiment of the present disclosure.

FIG. 17 is a flowchart of a procedure for operation control in the electronic device according to one embodiment of the present disclosure.

In one embodiment, the electronic device may be a wearable device capable of providing a virtual environment.

At operation 1710, the electronic device identifies the status (i.e. location) of the user in the virtual environment. For example, the electronic device may sense the motion or biometric response of the user. The electronic device may also perform head tracking or examine the direction of viewpoint of the user.

At operation 1720, the electronic device locates sound sources in the virtual environment. The electronic device may identify sound sources available in the virtual environment, find locations of the sound sources, and mark the sound source locations in the virtual environment.

At operation 1730, the electronic device determines whether at least one sound source is present within a predefined range with respect to the location of the user. The predefined range may be determined according to the status of the user in the virtual environment. The electronic device may consider a given range relative to the direction of the line-of-sight of the user as a range for determining presence of a sound source. For example, the electronic device may consider a specific range based on user head tracking in the virtual environment as a range for determining presence of a sound source. In one embodiment, the electronic device may receive information on the motion of the user from an external device (e.g. smartwatch) and select a suitable range according to the received information. For example, the electronic device may receive information on the direction indicated by a finger or on the gesture of the user from the external device and select a suitable range according to the received information.

In one embodiment, the electronic device may determine presence of audio data from a direction within the predefined range in the virtual environment. For example, the electronic device may check whether audio data is reproduced by a sound source in a direction within the predefined range in the virtual environment.

If a sound source is present within a predefined range, the procedure proceeds to operation 1740. If no sound source is present within the predefined range, the procedure proceeds to operation 1780.

At operation 1740, the electronic device extracts at least a portion of audio data output by the sound source within the predefined range.

At operation 1750, the electronic device converts at least a portion of the extracted audio data into text data. For example, when audio data is reproduced by a sound source present within the predefined range in the virtual environment, the electronic device may convert a portion of the audio data into text data.

At operation 1760, the electronic device highlights the extracted text data. For example, the electronic device may highlight the text data by use of the bold font, shading, change of color, change of font, or other suitable methods of highlighting discussed above and known in the art. The electronic device may also insert a punctuation mark in the text data or replace a specific word or phrase with an icon.

At operation 1770, the electronic device stores the text data together with additional information. For example, the electronic device may store the text data together with time information, location information, sensor information, or image information associated with the text data.

At operation 1780, if the sound source is not within the predefined range, the electronic device may perform a requested function in the virtual environment. For example, the electronic device may play back content (e.g. video and/or audio) selected according to user input in the virtual environment.

In one embodiment, the electronic device may skip or selectively perform one or more of operations 1750 to 1780.

In one embodiment, when a sound source is within the predefined range in the virtual environment, the electronic device may set the output level (i.e. volume) of audio data output by the sound source present within the predefined range. The electronic device may set the output level of audio data output by a sound source present within the predefined range according to user input.

In one embodiment, the electronic device may adjust the output level of audio data output by a sound source in the virtual environment according to the distance between the user and the sound source in the virtual environment. For example, the electronic device may estimate the distance between the user and a sound source in the virtual environment. When the distance between the user and a sound source is large in the virtual environment, the electronic device may set the output level of audio data output by the sound source to a small value; and when the distance between the user and a sound source is short in the virtual environment, the electronic device may set the output level of audio data output by the sound source to a large value.

FIG. 18 illustrates operations of the electronic device according to one embodiment of the present disclosure.

The electronic device may detect audio data in a virtual environment 1830 by sensing directivity. Here, the electronic device may be a HMD device (e.g. Glass) supporting audio output. For example, when the user 1801 explores a virtual reality world using an electronic device 1810 acting as a HMD device, various sound sources (objects) 1831, 1832, 1833 and 1834 may be present in the virtual environment 1830. The user 1801 may set the directivity indication of the electronic device 1810 to highlight a desired audio signal in the virtual environment 1830. For example, the electronic device 1810 may set the directivity indication to the direction of interest to the user 1801 through user head tracking or eye tracking. The electronic device 1810 may receive audio data from a sound source in a specific direction and store the received audio data as a voice memo.

In the virtual environment 1830, the electronic device 1810 may set the directivity indication according to user input. The electronic device 1810 may set the directivity indication to highlight a voice signal of a desired speaker or an audio signal of a desired object in the virtual environment 1830. The electronic device 1810 may increase the sensitivity, level, or volume of an audio signal coming from the specified direction. The electronic device 1810 may determine the direction of interest to the user 1801 by analyzing user gestures in the virtual environment 1830. When the user 1801 is wearing a wearable device (e.g. ring or watch), the wearable device may recognize a user gesture pointing to a specific person or object and send corresponding information to the electronic device 1810 or another external device (e.g. smartphone). Upon reception of the gesture information, the electronic device 1810 may set the directivity indication to the direction indicated by the user gesture. When audio data is received from a sound source in the selected direction in the virtual environment 1830, the electronic device 1810 may convert the received audio data into text data through speech-to-text conversion and store the text data. The electronic device 1810 may convert audio data received from the sound source in the selected direction into text data, highlight the text data, and store the highlighted text data. The electronic device 1810 may share stored audio data and text data with other electronic devices connected in an augmented or virtual reality world. The electronic device 1810 may send stored text data to external devices.

The electronic device 1810 may identify the direction of viewpoint or location of the user in the virtual environment 1830 by use of one or more sensors including an acceleration sensor, gyro sensor, and geomagnetic sensor. The electronic device 1810 may identify the distance between the user and a sound source and the directivity with respect to the direction of viewpoint of the user in the virtual environment 1830. Upon determining that an audio signal is coming from a designated direction in the virtual environment 1830, the electronic device 1810 may selectively record the audio signal.

In one embodiment, the electronic device may recognize a speaker or talker in the vicinity thereof. For example, when the electronic device is smart glasses, it may recognize a speaker in the vicinity using an embedded camera. The electronic device may capture an image of a speaker and recognize the face in the image. The electronic device may analyze the recognized speaker and a sound received from the direction of the speaker and store sound information corresponding to the speaker. For a speaker, the electronic device may store the facial image and voice of the speaker as speaker information. In one embodiment, the electronic device may recognize a specific speaker through voice recognition. When voice information is stored, the electronic device may receive speaker information and store the speaker information and the voice information so that they are associated with each other. After receiving and storing information on a specific speaker, the electronic device may recognize the speaker by analyzing a received voice. In one embodiment, the electronic device may recognize persons or speakers in the vicinity thereof by use of image information or voice information and may perform various functions by use of pre-stored information for the persons. For example, the electronic device may separately store sounds picked up in the vicinity by different speakers. The electronic device may separately convert and transmit sounds by different speakers. As an example, when multiple sounds are received from three speakers A, B and C, the electronic device may convert the sound only from the speaker A to text data or store the sound only from the speaker B. That is, the electronic device may separately manage received sounds or data items converted from the sounds on a speaker basis.

In one embodiment, the electronic device may support teleconferencing. For example, the electronic device may support tele or video conferencing, virtual reality (VR), or augmented reality.

In one embodiment, the electronic device may store voices of individual participants (speakers) in a teleconference. To store voices of individual speakers in an organized manner, the electronic device may store voices of speakers together with information related to the directions of the speakers. For example, the electronic device may store sounds (voices) together with information regarding the directions and/or locations at which the sounds have been generated. The electronic device may generate content containing the minutes of the meeting by use of voices and location information of individual speakers. Here, statements of the speakers in the teleconference may be organized into the minutes of the meeting. The electronic device may combine information on the speakers, statements (sounds) of the speakers, and text data corresponding to the statements into conference data and store the conference data.

In one embodiment, the electronic device may combine audio from different speakers in the teleconference and provide combined information to the user. The electronic device may generate or receive information regarding images, voices, and text data items of different speakers and present the information on the display. The electronic device may extract some of statements of a speaker, convert the extracted statements into text data, and display the text data in a window showing the face of the speaker or surrounding the speaker.

According to one embodiment of the present disclosure, a method for operating an electronic device may include: detecting a sound using one or more microphones; determining whether a direction of the sound is within a predefined range; and extracting at least a portion of the sound for further processing when the direction of the sound is within the predefined range.

In one embodiment, the method may include generating a first signal corresponding to a first sound detected by a first microphone, generating a second signal corresponding to a second sound detected by a second microphone, and determining whether the direction of the sound is within the predefined range based on a result of a comparison between the first signal and the second signal.

In one embodiment, the method may further include storing the extracted portion of the sound or sending the extracted portion of the sound to an external device.

In one embodiment, the method may further include determining an angle corresponding to the predefined range for the determination of whether the direction of the sound is within the predefined range.

In one embodiment, the method may further include converting the extracted portion of the sound into text data; and storing the text data in a memory or sending the text data to an external device.

In one embodiment, the method may further include applying a selected highlighting effect to at least a portion of the text data according to a selected criteria and displaying the portion of the text data with the selected highlighting effect.

In one embodiment, the selected criteria are selected based on at least one of: whether the direction of the sound is within the predefined range, whether at least a portion of the sound matches a voice of a user, whether a volume of the sound is higher than or equal to a preset threshold, whether a selection signal is received from an external device, and whether a portion of the text data matches one or more predetermined words.

In one embodiment, the selected highlighting effect is at least one of use of: a bold font, a shading, an italic font, a change of color, an insertion of a punctuation mark, a replacement of at least a portion of the text data with an icon, and a change of font.

In one embodiment, the method may further sending the detected sound and information on the direction of the sound to an external device.

According to one embodiment of the present disclosure, a method for operating an electronic device may include: receiving, from an external device, a sound detected by the external device and information on a direction of the sound; determining whether the direction of the sound is within a predefined range; and extracting at least a portion of the sound for further processing when the direction of the sound is within the predefined range.

According to one embodiment of the present disclosure, a method for operating an electronic device having a first microphone may include: detecting a first sound using the first microphone of the electronic device; receiving, from an external device, information on a direction of a second sound detected by a second microphone of the external device; and extracting at least a portion of the first sound based on the information on the direction of the second sound.

According to one embodiment of the present disclosure, a method of for operating an electronic device may include: receiving data corresponding to a sound from a first external device; receiving information on a direction of the sound from a second external device; determining whether the direction of the sound is within a predefined range; and extracting at least a portion of the data corresponding to the sound for further processing when the direction of the sound is within the predefined range.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

What is claimed is:

1. An electronic device comprising:
    a housing having a coupling member removably attachable to an ear of a user;
    one or more microphones provided within the housing and configured to detect an external sound;
    at least one speaker provided within the housing;
    at least one communication circuit provided within the housing;
    a processor provided within the housing and electrically coupled to the one or more microphones, the at least one speaker, and the at least one communication circuit; and
    at least one memory provided within the housing, and electrically coupled to the processor, wherein the memory stores instructions that cause, when executed, the processor:
        to receive the detected external sound from the one or more microphones,
        to identify a direction of the external sound in relation to the user and a direction at which the user gazes,
        to determine whether the direction of the external sound is within a predefined range with respect to the direction at which the user gazes,
        to extract at least a portion of the external sound when the direction of the external sound is within the predefined range,
        to convert the extracted portion of the external sound into text data, when the direction of the external sound is within the predefined range, and not to convert the external sound into text data when the direction of the external sound is not within the predefined range, and
        to store the text data in the memory or to transmit the text data to an external device via the communication circuit.

2. The electronic device of claim 1, wherein the one or more microphones includes a first microphone and a second microphone, and wherein the instructions further cause the processor:
    to generate a first signal corresponding to a first sound detected by the first microphone,
    to generate a second signal corresponding to a second sound detected by the second microphone, and
    to determine whether the direction of the external sound is within the predefined range based on a result of a comparison between the first signal and the second signal.

3. The electronic device of claim 1, wherein the instructions further cause the processor:
    to store the extracted portion of the external sound in the at least one memory, or
    to transmit the extracted portion of the external sound to the external device via the communication circuit.

4. The electronic device of claim 2, wherein the first microphone and the second microphone are placed at different locations within the housing.

5. The electronic device of claim 1, wherein the predefined range is selected based on user input, and the instructions further cause the processor to determine an angle corresponding to the predefined range for the determination of whether the direction of the external sound is within the predefined range.

6. The electronic device of claim 1, further comprising a display electrically coupled to the processor, and wherein the instructions further cause the processor:
    to apply a selected highlighting effect to at least a portion of the text data according to a selected criteria, and
    to control the display to display the portion of the text data with the selected highlighting effect.

7. The electronic device of claim 6, wherein the selected criteria are selected based on at least one of: whether the direction of the external sound is within the predefined range, whether at least a portion of the external sound matches a voice of the user, whether a volume of the external sound is higher than or equal to a preset threshold, whether a selection signal is received from the external device, and whether a portion of the text data matches one or more predetermined words.

8. The electronic device of claim 6, wherein the selected highlighting effect is at least one of: a bold font, a shading, an italic font, a change of color, an insertion of a punctuation mark, a replacement of at least a portion of the text data with an icon, and a change of font.

9. The electronic device of claim 6, wherein the instructions further cause the processor to apply no highlighting effect to the text data when the direction of the external sound is not within the predefined range.

10. The electronic device of claim 1, wherein the predefined range is selected by user input entered in the external device and transmitted from the external device to the electronic device.

11. An electronic device comprising:
    one or more microphones configured to detect an external sound;
    a processor electrically coupled to the one or more microphones; and
    a memory electrically coupled to the processor, wherein the memory stores instructions that cause, when executed, the processor:
        to receive the detected external sound from the one or more microphones,
        to identify a direction of the external sound in relation to a user and a direction at which a user gazes,
        to determine whether the direction of the external sound is within a predefined range with respect to the direction at which the user gazes,
        to extract at least a portion of the external sound when the direction of the external sound is within the predefined range,
        to convert the extracted portion of the external sound into text data, when the direction of the external sound is within the predefined range, and not to convert the external sound into text data when the direction of the external sound is not within the predefined range,
        to store the text data in the memory, and
        to transmit at least one of the external sound, determined direction information, the text data to an external device.

12. The electronic device of claim 11, further comprising:
a housing having a coupling member removably attachable to an ear of a user;
a communication circuit provided within the housing or on an external surface of the housing, and electrically coupled to the processor; and
a speaker disposed within an opening of the housing and electrically coupled to the processor.

13. An electronic device comprising:
a communication module;
a processor electrically coupled to the communication module; and
a memory electrically coupled to the processor, wherein the memory stores instructions that cause, when executed, the processor:
to receive a sound detected by an external device and information on a direction of the sound from the external device,
to determine whether the direction of the sound is within a predefined range with respect to a direction at which a user gazes,
to extract at least a portion of the sound when the direction of the sound is within the predefined range,
to convert the extracted portion of the external sound into text data, when the direction of the sound is within the predefined range, and not to convert the external sound into text data when the direction of the sound is not within the predefined range, and
to store the text data in the memory or to transmit the text data to the external device via the communication module.

14. An electronic device comprising:
a first microphone;
a processor electrically coupled to the first microphone; and
a memory electrically coupled to the processor, wherein the memory stores instructions that cause, when executed, the processor:
to detect a first sound using the first microphone,
to receive, from an external device, information on a direction of a second sound detected by a second microphone of the external device and a direction at which a user gazes,
to extract at least a portion of the first sound for further processing based on the information on the direction of the second sound and the direction at which the user gazes,
to convert the extracted portion of the first sound into text data, when the direction of the second sound is within a predefined range, and not to convert the first sound into text data when the direction of the second sound is not within the predefined range, and
to store the text data in the memory or to transmit the text data to the external device.

15. An electronic device comprising:
a housing having a coupling member removably attachable to an ear of a user;
one or more microphones provided within the housing, and configured to detect an external sound;
at least one speaker provided within the housing;
at least one communication circuit provided within the housing;
a processor provided within the housing, and electrically coupled to the one or more microphones, the at least one speaker, and the at least one communication circuit; and
at least one memory placed in the housing, and electrically coupled to the processor, wherein the memory stores instructions that cause, when executed, the processor:
to identify a direction of the external sound in relation to the user and a direction at which the user gazes,
to generate information based on the direction of the external sound and the direction at which the user gazes,
to extract at least a portion of the external sound when the direction of the external sound is within a predefined range with respect to the direction at which the user gazes,
to convert the extracted portion of the external sound into text data, when the direction of the external sound is within the predefined range, and not to convert the external sound into text data when the direction of the external sound is not within the predefined range,
to store the text data in the memory, and
to transmit the generated information or the text data to an external device via the at least one communication circuit.

16. An electronic device comprising:
a communication module;
a processor electrically coupled to the communication module; and
a memory electrically coupled to the processor, wherein the memory stores instructions that cause, when executed, the processor:
to receive data corresponding a sound from a first external device,
to receive information on a direction of the sound from a second external device,
to determine whether the direction of the sound is within a predefined range with respect to a direction at which a user gazes,
to extract at least a portion of the data corresponding to the sound when the direction of the sound is within the predefined range,
to convert the extracted portion of the data into text data, when the direction of the sound is within the predefined range, and not to convert the data into text data when the direction of the sound is not within the predefined range, and
to store the text data in the memory or transmit the text data to the first external device via the communication module.

17. A method for operating an electronic device, the method comprising:
detecting a sound using one or more microphones;
determining whether a direction of the sound is within a predefined range with respect to a direction at which a user gazes;
extracting at least a portion of the sound when the direction of the sound is within the predefined range;
converting the extracted portion of the sound into text data, when the direction of the sound is within the predefined range, and not converting the sound into text data when the direction of the sound is not within the predefined range; and
storing the text data in a memory of the electronic device or transmitting the text data to an external device via a communication circuit of the electronic device.

18. The method of claim 17, further comprising:
generating a first signal corresponding to a first sound detected by a first microphone, generating a second signal corresponding to a second sound detected by a second microphone, and determining whether the direction of the sound is within the predefined range based on a result of a comparison between the first signal and the second signal.

19. The method of claim 17, further comprising storing the extracted portion of the sound or transmitting the extracted portion of the sound to an external device.

20. The method of claim 17, further comprising determining an angle corresponding to the predefined range for the determination of whether the direction of the sound is within the predefined range.

21. The method of claim 17, further comprising applying a selected highlighting effect to at least a portion of the text data according to a selected criteria and displaying the portion of the text data with the selected highlighting effect.

22. The method of claim 21, wherein the selected criteria are selected based on at least one of: whether the direction of the sound is within the predefined range, whether at least a portion of the sound matches a voice of a user, whether a volume of the sound is higher than or equal to a preset threshold, whether a selection signal is received from the external device, and whether a portion of the text data matches one or more predetermined words.

23. The method of claim 21, wherein the selected highlighting effect is at least one of use of: a bold font, a shading, an italic font, a change of color, an insertion of a punctuation mark, a replacement of at least a portion of the text data with an icon, and a change of font.

24. The method of claim 17, further comprising transmitting the detected sound and information on the direction of the sound to the external device.

25. A method for controlling an electronic device, the method comprising:

receiving, from an external device, a sound detected by the external device and information on a direction of the sound;

determining whether the direction of the sound is within a predefined range with respect to a direction at which a user gazes;

extracting at least a portion of the sound when the direction of the sound is within the predefined range;

converting the extracted portion of the sound into text data, when the direction of the sound is within the predefined range, and not converting the sound into text data when the direction of the sound is not within the predefined range; and storing the text data in a memory of the electronic device or transmitting the text data to the external device via a communication circuit of the electronic device.

26. A method for operating an electronic device having a first microphone, the method comprising:

detecting a first sound using the first microphone of the electronic device;

receiving, from an external device, information on a direction of a second sound detected by a second microphone of the external device and a direction at which a user gazes;

extracting at least a portion of the first sound based on the information on the direction of the second sound and the direction at which the user gazes;

converting the extracted portion of the first sound into text data, when the direction of the second sound is within a predefined range, and not to converting the first sound into text data when the direction of the second sound is not within the predefined range; and storing the text data in a memory of the electronic device, or transmitting the text data to the second external device via a communication module of the electronic device.

27. A method for operating an electronic device, the method comprising:

receiving data corresponding to a sound from a first external device;

receiving information on a direction of the sound from a second external device;

determining whether the direction of the sound is within a predefined range with respect to a direction at which a user gazes;

extracting at least a portion of the data corresponding to the sound when the direction of the sound is within the predefined range;

converting the extracted portion of the data into text data, when the direction of the sound is within the predefined range, and not to converting the data into text data when the direction of the sound is not within the predefined range; and storing the text data in a memory of the electronic device, or transmitting the text data to the first external device.

28. An electronic device comprising:

one or more microphones configured to detect an external sound;

at least one communication circuit;

a processor electrically coupled to the one or more microphones; and a memory electrically coupled to the processor, wherein the memory stores instructions that cause, when executed, the processor:

to receive the detected external sound from the one or more microphones, to identify a direction of the external sound in relation to a user and a direction at which the user gazes, to determine whether the direction of the sound is within a predefined range with respect to the direction at which the user gazes, and to extract at least a portion of the sound when the direction of the sound is within the predefined range, to convert the extracted portion of the sound into text data, when the direction of the sound is within the predefined range, and not to convert the sound into text data when the direction of the sound is not within the predefined range, and to store the text data in the memory or to transmit the text data to an external device via the at least one communication circuit.

* * * * *